(12) United States Patent
Kuroki et al.

(10) Patent No.: US 12,025,043 B1
(45) Date of Patent: Jul. 2, 2024

(54) EXHAUST GAS PROCESSING DEVICE

(71) Applicant: Marelli Corporation, Saitama (JP)

(72) Inventors: Kouhei Kuroki, Saitama (JP);
Shunichi Mitsuishi, Saitama (JP);
Hiroaki Masubuchi, Saitama (JP);
Toru Hisanaga, Saitama (JP); Toru Iijima, Saitama (JP); Yoshihiro Shiga, Saitama (JP); Takaharu Yamamoto, Saitama (JP); Masayuki Hara, Saitama (JP)

(73) Assignee: Marelli Corporation, Saitama (JP)

( * ) Notice: Subject to any disclaimer, the term of this patent is extended or adjusted under 35 U.S.C. 154(b) by 0 days.

(21) Appl. No.: 18/009,639

(22) PCT Filed: Aug. 3, 2022

(86) PCT No.: PCT/JP2022/029838
§ 371 (c)(1),
(2) Date: Dec. 9, 2022

(87) PCT Pub. No.: WO2023/013693
PCT Pub. Date: Feb. 9, 2023

(30) Foreign Application Priority Data

Aug. 5, 2021 (JP) .................................. 2021-129328
Dec. 3, 2021 (JP) .................................. 2021-197164

(51) Int. Cl.
*F01N 3/20* (2006.01)
*B01D 53/94* (2006.01)
(Continued)

(52) U.S. Cl.
CPC ....... *F01N 3/2026* (2013.01); *B01D 53/9495* (2013.01); *F01N 3/2803* (2013.01);
(Continued)

(58) Field of Classification Search
CPC .......... F01N 3/2026; F01N 13/10; F01N 9/00; F01N 2900/12; F01N 3/2006;
(Continued)

(56) References Cited

U.S. PATENT DOCUMENTS

2018/0258826 A1* 9/2018 Kuramashi ............... F01N 3/10

FOREIGN PATENT DOCUMENTS

| JP | 2011-202512 A | 10/2011 |
| JP | 2015-075068 A | 4/2015 |
| JP | 2020-143662 A | 9/2020 |

* cited by examiner

*Primary Examiner* — Brandon D Lee
(74) *Attorney, Agent, or Firm* — Young Basile Hanlon & MacFarlane, P.C.

(57) ABSTRACT

An exhaust gas processing device includes: a manifold configured to change a travelling direction of exhaust gas from a first direction to a second direction; a first catalyst carrier into which the exhaust gas that has been guided from the manifold flows, the first catalyst carrier being configured to purify the exhaust gas that is flowing in the second direction; a heater provided on the upstream of the first catalyst carrier in the flowing direction of the exhaust gas, the heater being configured to heat the exhaust gas that has entered from the manifold; and a case accommodating the first catalyst carrier and the heater, wherein an inlet-side opening portion of the case is inserted into the manifold to a position facing an inlet of the manifold, and the inlet-side opening portion is formed with an inlet-side cut-out portion configured to allow passage of the exhaust gas.

6 Claims, 23 Drawing Sheets

(51) Int. Cl.
*F01N 3/28* (2006.01)
*F01N 9/00* (2006.01)
*F01N 13/10* (2010.01)

(52) U.S. Cl.
CPC ............... *F01N 9/00* (2013.01); *F01N 13/10* (2013.01); *B01D 2259/4566* (2013.01); *F01N 3/2006* (2013.01); *F01N 2240/16* (2013.01); *F01N 2470/00* (2013.01); *F01N 2900/104* (2013.01); *F01N 2900/12* (2013.01); *F01N 2900/1602* (2013.01)

(58) Field of Classification Search
CPC ............. F01N 2240/16; F01N 2340/00; F01N 2470/00; F01N 2900/1602; B01D 53/9495; B01D 2259/4566
See application file for complete search history.

EXHAUST GAS PROCESSING DEVICE

CROSS-REFERENCE TO RELATED APPLICATION(S)

This application claims priority to Japanese Patent Application No. JP 2021-129328, filed Aug. 5, 2021, and Japanese Patent Application No. JP 2021-197164, filed Dec. 3, 2021, the entire disclosures of which are hereby incorporated by reference.

TECHNICAL FIELD

The present invention relates to an exhaust gas processing device.

BACKGROUND ART

JP2020-143662A discloses a catalytic converter having an electrically heated catalyst (a heater) on the upstream side of a catalyst for purifying exhaust gas.

SUMMARY OF INVENTION

In the above-described catalytic converter, a diffusion tube is inserted into an inner tube for accommodating the electrically heated catalyst. With such a structure, if the diffusion tube is to be inserted deeper, the diffusion tube comes to interfere with the electrically heated catalyst, and therefore, it is not possible to sufficiently reduce the size.

An object of the present invention is to achieve reduction in the size of an exhaust gas processing device while suppressing inhibition of flow of exhaust gas caused by the size reduction.

According to an aspect of the present invention, an exhaust gas processing device configured to process exhaust gas discharged from an engine includes: a manifold having an inlet through which the exhaust gas that has been discharged from the engine and that is flowing in a first direction enters and an outlet configured to guide the exhaust gas to downstream such that the exhaust gas flows in a second direction intersecting with the first direction, the manifold being configured to change a travelling direction of the exhaust gas from the first direction to the second direction; a first catalyst carrier into which the exhaust gas that has been guided from the outlet of the manifold flows, the first catalyst carrier being configured to purify the exhaust gas that is flowing in the second direction; a heater provided on upstream of the first catalyst carrier in a flowing direction of the exhaust gas, the heater being configured to heat the exhaust gas that has entered from the manifold and that is to be guided to the first catalyst carrier; and a case accommodating the first catalyst carrier and the heater, wherein an inlet-side opening portion of the case is inserted into an inner circumference of the outlet of the manifold to a position facing the inlet of the manifold, and the inlet-side opening portion is formed with an inlet-side cut-out portion, the inlet-side cut-out portion being configured to allow passage of the exhaust gas flowing from the inlet of the manifold.

DESCRIPTION OF EMBODIMENTS

In the following, an embodiment of the present invention will be described with reference to the attached drawings.

In the following, an exhaust gas processing device 1 according to the embodiment of the present invention will be described with reference to FIGS. 1 to 23.

Figure 1:
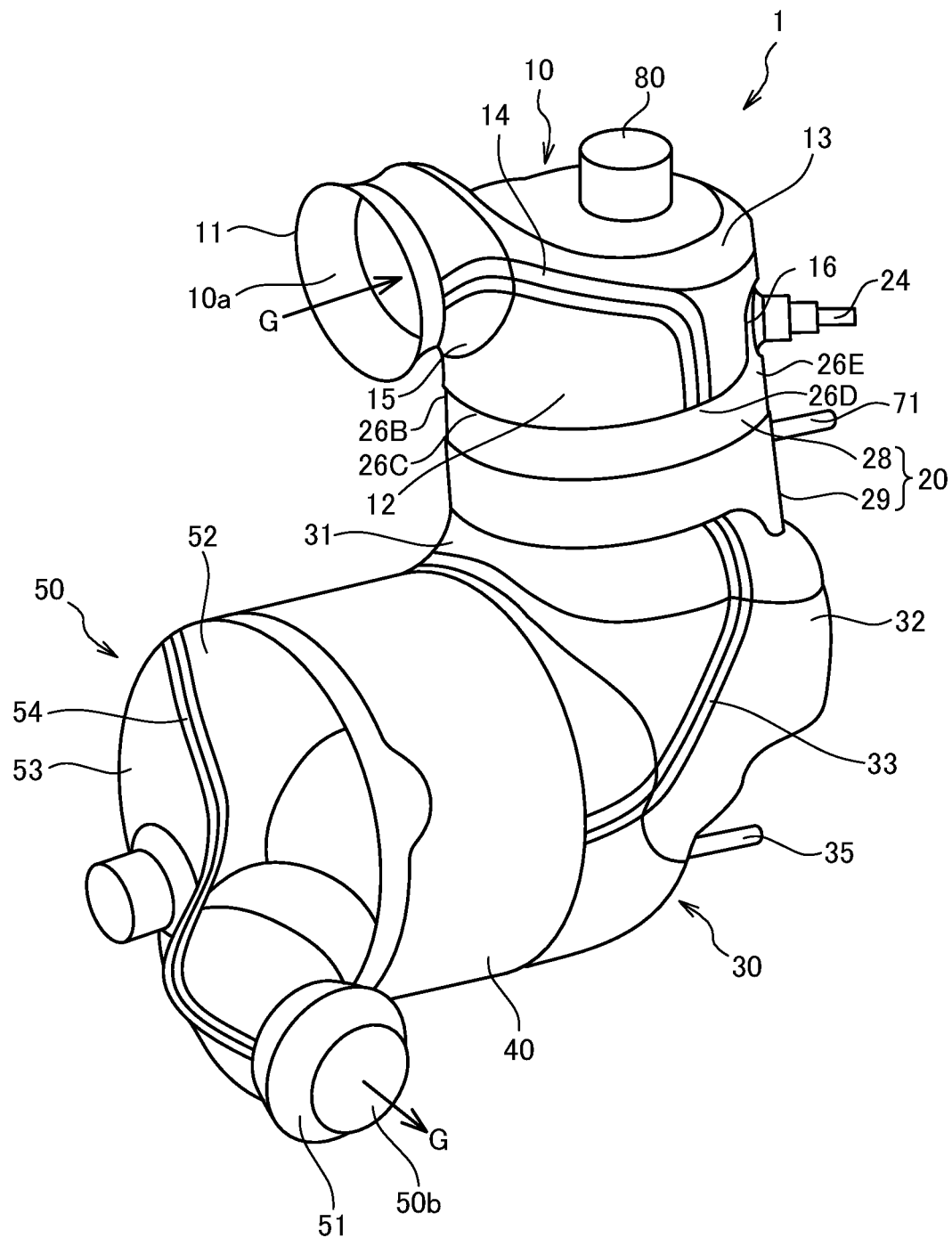
FIG. 1 is a perspective view of an exhaust gas processing device according to an embodiment of the present invention.
Figure 2:
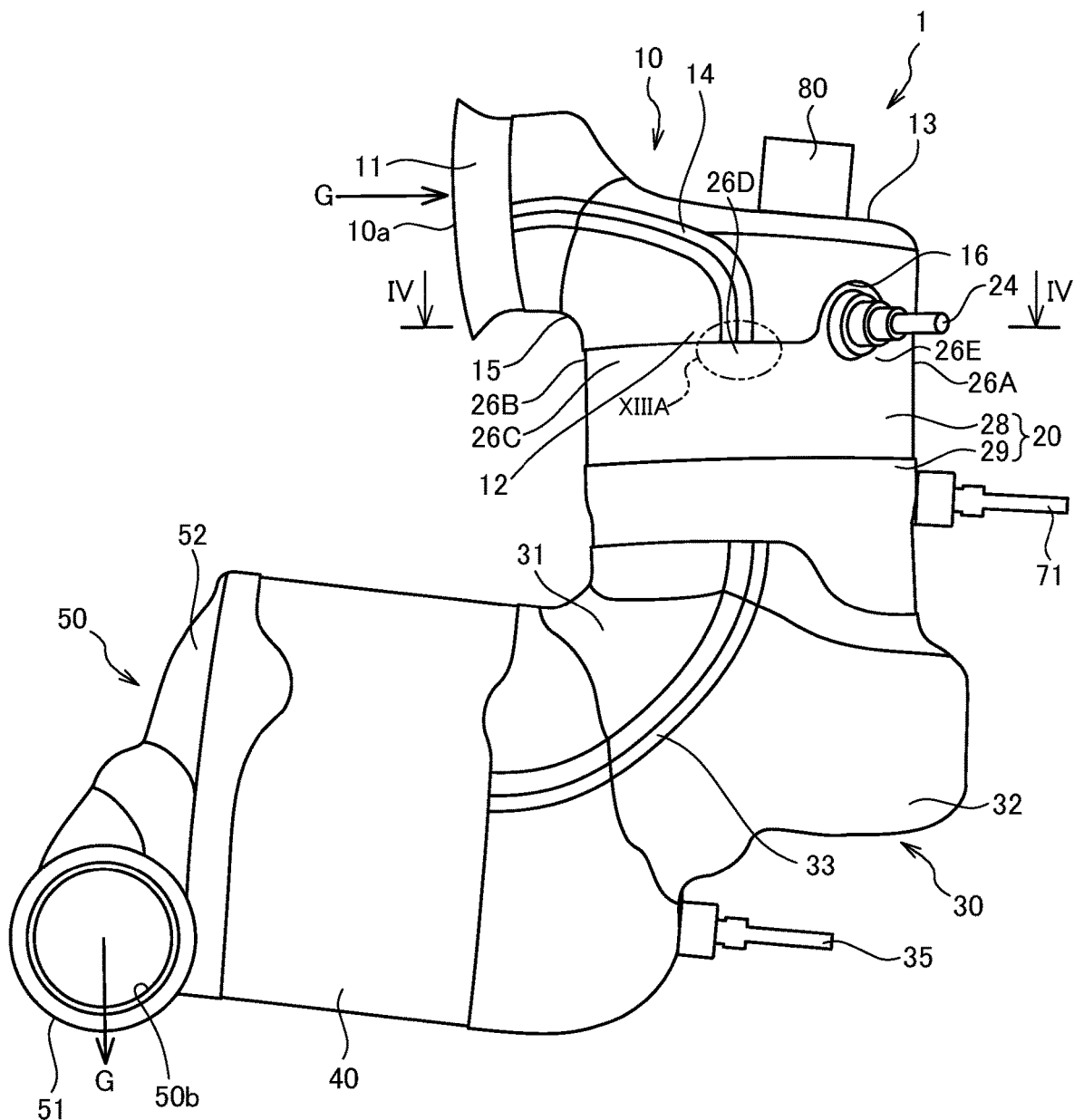
FIG. 2 is a front view of the exhaust gas processing device.
Figure 3:
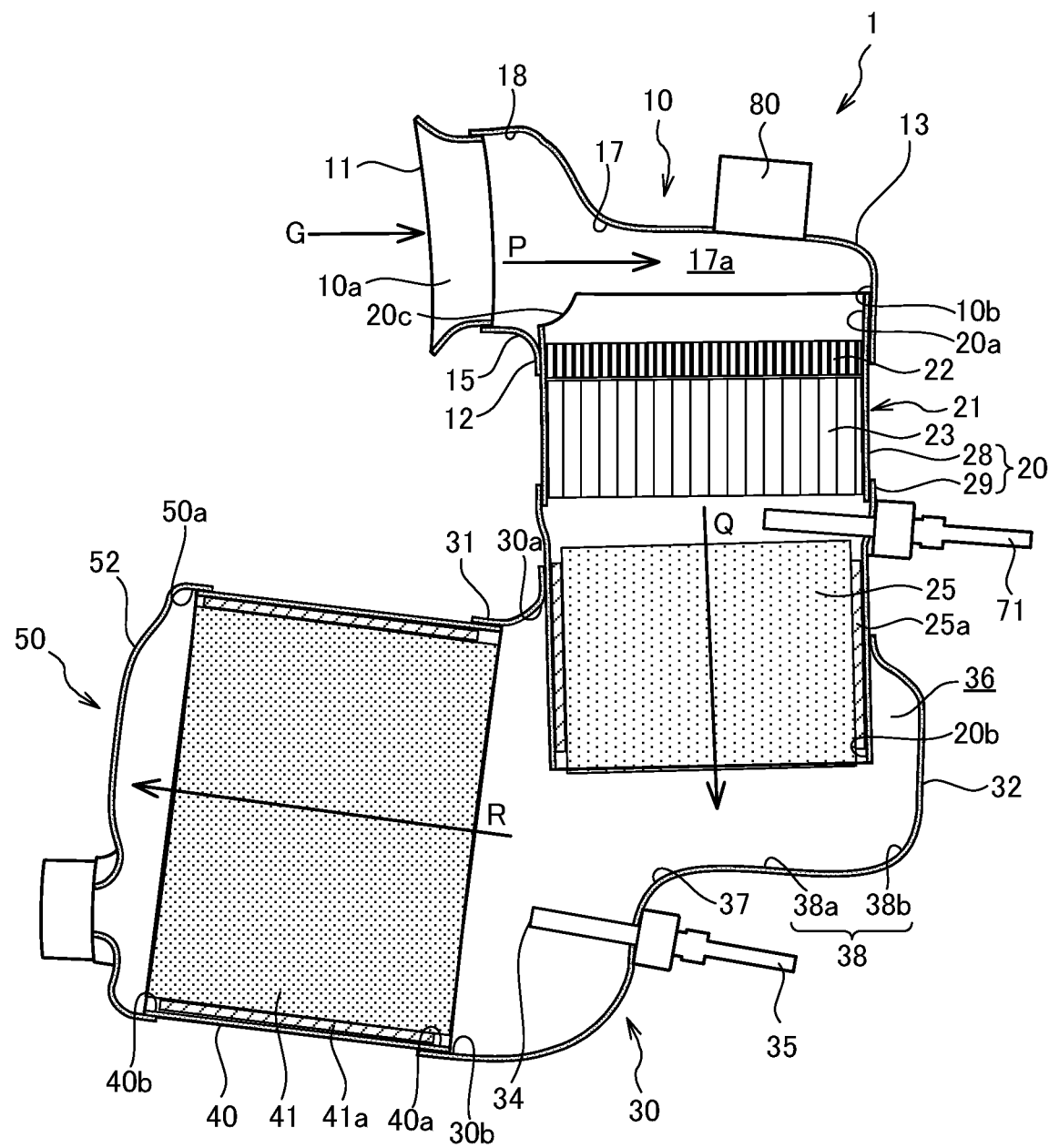
FIG. 3 is a sectional view showing an outline of the exhaust gas processing device.

An overall configuration of the exhaust gas processing device 1 will be described first with reference to FIGS. 1 to 3. FIG. 1 is a perspective view of the exhaust gas processing device 1. FIG. 2 is a front view of the exhaust gas processing device 1. FIG. 3 is a sectional view showing an outline of the exhaust gas processing device 1.

The exhaust gas processing device 1 is mounted on a vehicle to process exhaust gas G discharged from an engine (not shown). This embodiment shows an example configuration of the exhaust gas processing device 1 that serves as a small-sized catalytic converter having an excellent exhaust gas purifying capability. Specifically, the exhaust gas processing device 1 purifies the exhaust gas G by converting hydrocarbons and carbon monoxide contained in the exhaust gas G to carbon dioxide and water via oxidation and by performing reduction of nitrogen oxides and removal of fine particulate matters.

As shown in FIGS. 1 and 2, the exhaust gas processing device 1 is provided with a first flow path member 10 serving as a manifold, a first case 20, a second case 30, a third case 40, and a second flow path member 50. In this embodiment, the first case 20, the second case 30, and the third case 40 each corresponds to a case. As shown in FIG. 3, the exhaust gas processing device 1 is provided with an EHC (Electrically Heated Catalyst) 21, a TWC (Three-Way Catalyst) 25 serving as a first catalyst carrier, and a GPF (Gasoline Particulate Filter) 41 serving as a second catalyst carrier.

As shown in FIGS. 1 and 2, the first flow path member 10 has an inlet-side flange 11, a first member 12, a second member 13, and overlapped portions 14. As shown in FIG. 3, the first flow path member 10 has an inlet-side opening portion 10a serving as an inlet through which the exhaust gas G enters and an outlet-side opening portion 10b serving as an outlet through which the exhaust gas G flows out. The first flow path member 10 is provided with a secondary-air control unit 80.

As shown in FIGS. 1 and 2, the inlet-side flange 11 is connected to an exhaust gas outlet portion of an exhaust gas turbine (not shown). The inlet-side flange 11 is provided so as to project out from the first flow path member 10 in the radial direction of the first case 20. The inlet-side opening portion 10a is provided at a projected end portion of the inlet-side flange 11. The inlet-side flange 11 is formed to have a barrel shape so as to have a smooth curved shape, the diameter of which is gradually reduced along the flowing direction of the exhaust gas G. Because the inlet-side flange 11 is formed to have the smooth curved shape, the flow of the exhaust gas G to be guided towards the first flow path member 10 is improved.

The first member 12 is provided on the inner side with respect to the flow of the exhaust gas G. The second member 13 is provided on the outer side with respect to the flow of the exhaust gas G. The first member 12 and the second member 13 are overlapped at the overlapped portions 14, and they are welded and fixed (hereinafter, simply referred to as "welded") at the overlapped portions 14 to form a single body.

Although the overlapped portions 14 are respectively provided at positions perpendicular to the travelling direction of the exhaust gas G when the exhaust gas G that has entered from the inlet-side opening portion 10a travels in the straight line, the positions of the overlapped portions 14 can be determined appropriately.

As shown in FIG. 3, the exhaust gas G that has been discharged from the engine and that is flowing in the first direction P enters from the inlet-side opening portion 10a. From the outlet-side opening portion 10b, the exhaust gas G is guided towards the downstream side so as to flow in the second direction Q intersecting with the first direction P. The term "intersecting" described herein merely means that the second direction Q is different relative to the first direction P, and it is not limited to a case in which they intersect perpendicularly. The first flow path member 10 changes the travelling direction of the exhaust gas G from the first direction P to the second direction Q. In this embodiment, in the first flow path member 10, the flow of the exhaust gas G flowing from the radial direction of the first case 20 in the first direction P is turned substantially perpendicularly to the flow flowing along the second direction Q corresponding to the center axial direction of the first case 20.

The first flow path member 10 has a curved portion 15 that is connected to a part adjacent to an inlet-side opening portion 20a among the first case 20 so as to form a curved surface and such that the travelling direction of the exhaust gas G is changed smoothly.

The first flow path member 10 has a projecting portion 17 that forms a linear flow path 17a along which the exhaust gas G can travel in the straight line in the first direction P by passing through an inlet-side cut-out portion 20c and that shifts the flowing direction of a part of the flow of the exhaust gas G from the first direction P to the second direction Q on the upstream side of the linear flow path 17a. With such a configuration, because the flowing direction of the exhaust gas G is shifted at a proximal position while the exhaust gas G is received to an opposing wall portion 26A at a distal position, it is possible to achieve a uniform flow rate distribution of the exhaust gas G in the first case 20. In addition, the projecting portion 17 is formed such that a flow path area is reduced gradually along the travelling direction of the exhaust gas G when the exhaust gas G that has entered from the inlet-side opening portion 10a travels in the straight line. By providing the projecting portion 17, the exhaust gas G becomes less likely to flow to the opposing wall portion 26A, which will be described later, it becomes possible to arrange an electrode 24 of an EHC 21 in a vicinity of the opposing wall portion 26A. Electrode arrangeable regions 26E at which the electrode 24 can be arranged will be described in detail below with reference to FIG. 4.

The first flow path member 10 has an expanded portion 18 that is provided on the upstream side of the projecting portion 17 in the flowing direction of the exhaust gas G to expand the flow path area of the exhaust gas G. By providing the expanded portion 18, the flow of the exhaust gas G in the first flow path member 10 is improved.

The secondary-air control unit 80 supplies the air (secondary air) into the first flow path member 10 when the engine is not operated and the exhaust gas G is not flowing. The secondary-air control unit 80 is provided on the projecting portion 17 of the first flow path member 10. The secondary-air control unit 80 supplies (injects) the air towards the EHC 21. The secondary-air control unit 80 is capable of adjusting a flow rate [kg/h] of the air to be supplied. The air supplied by the secondary-air control unit 80 is heated by the EHC 21 and is guided to a TWC 25. With such a configuration, even when the exhaust gas G is not flowing, it is possible to heat the TWC 25.

As shown in FIGS. 1 and 2, the first case 20 is formed to have a barrel shape. As shown in FIG. 3, the first case 20 has the inlet-side opening portion 20a through which the exhaust gas G enters (for receiving the exhaust gas G from the first flow path member 10) and an outlet-side opening portion 20b through which the exhaust gas G flows out. An upstream end portion of the first case 20 is inserted into an inner circumference of the outlet-side opening portion 10b of the first flow path member 10. The first case 20 is welded to the first flow path member 10. A temperature sensor 71 is provided on the first case 20.

The first case 20 has an upstream-side barrel portion 28 having a barrel shape and a downstream-side barrel portion 29 having a barrel shape. A downstream end portion of the upstream-side barrel portion 28 is inserted into and welded to an upstream end portion of the downstream-side barrel portion 29. The EHC 21 is accommodated in the upstream-side barrel portion 28. The TWC 25 is accommodated in the downstream-side barrel portion 29.

The EHC 21 is provided on the upstream side of the TWC 25 in the flowing direction of the exhaust gas G and heats the exhaust gas G that has entered from the first flow path member 10 and that is to be guided to the TWC 25 by flowing in the second direction Q. The EHC 21 has a heater 22, an electrode support body 23, and the electrode 24.

The heater 22 generates heat by current applied by the electrode 24. The heater 22 is, for example, an electric heater having a spiral shape. The heater 22 is formed of a metal. The heater 22 is held in the first case 20 (the upstream-side barrel portion 28).

The electrode support body 23 is positioned on the upstream side of the TWC 25. The electrode support body 23 is formed of a honeycomb structure body that supports the heater 22 and the electrode 24. An outer circumferential surface of the electrode support body 23 is held in the first case 20 (the upstream-side barrel portion 28).

The electrode 24 is provided so as to project out from the heater 22 towards the outside of the first case 20 (the upstream-side barrel portion 28) in the direction intersecting with the second direction Q (in this case, in the radial direction of the first case 20). Electric power is supplied from the electrode 24 to the heater 22.

A plurality of pins (not shown) for maintaining a gap between the heater 22 and the electrode support body 23 and for holding the heater 22 and the electrode 24 are provided between the heater 22 and the electrode support body 23. The plurality of pins are provided between the heater 22 and the electrode support body 23 so as to be inserted into both of the heater 22 and the electrode support body 23.

In the exhaust gas processing device 1, at the time of cold start (at the time of cold-state start) during the start of the engine, by applying the electric current through the heater 22 via the electrode 24, the heating is performed until the temperature of the exhaust gas G flowing in the first case 20 reaches 200 to 300[° C.], and thus heated exhaust gas G is utilized to heat the TWC 25. With such a configuration, it is possible to cause a catalyst component of the TWC 25 to reach the activation temperature within a short period of time. As described above, in the exhaust gas processing device 1, because the activation of the catalyst component of the TWC 25 can be achieved within a short period of time, it is possible to improve the purifying capability during the start of the engine.

The EHC 21 may be of a type in which the temperature is increased by applying the electric current to a conductive carrier carrying the catalyst. In this case, the EHC 21 corresponds to the first catalyst carrier.

Figure 20:
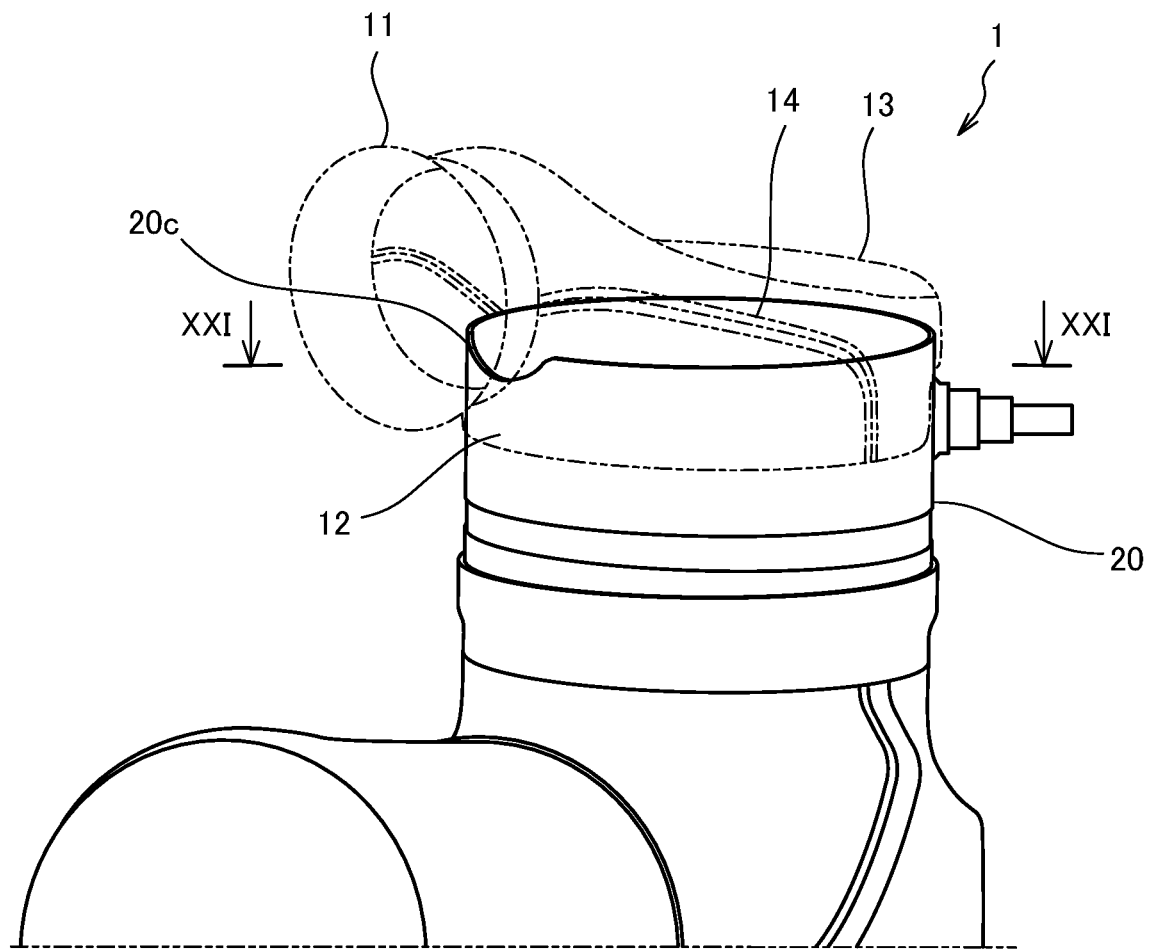
FIG. 20 is a perspective view showing one of modifications of the embodiment of the present invention.
Figure 21:
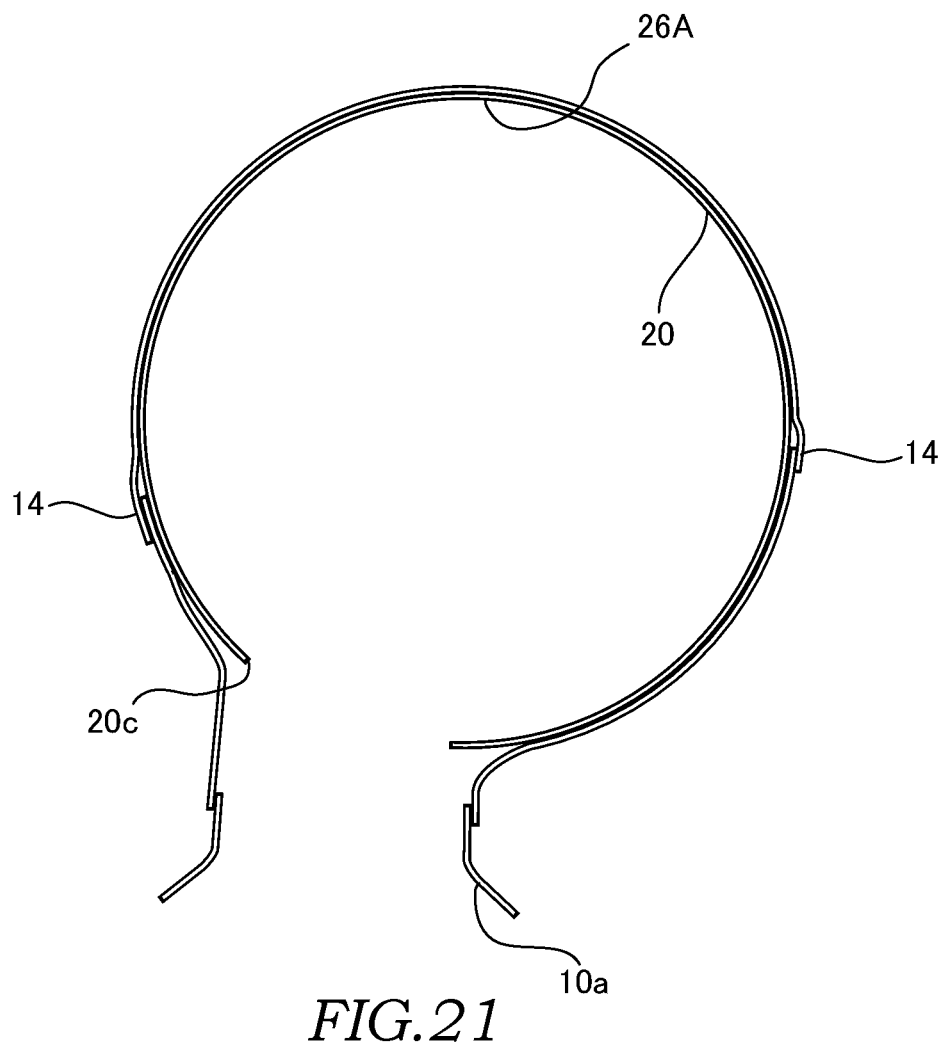
FIG. 21 is a sectional view taken along XXI-XXI in FIG. 20.
Figure 22:
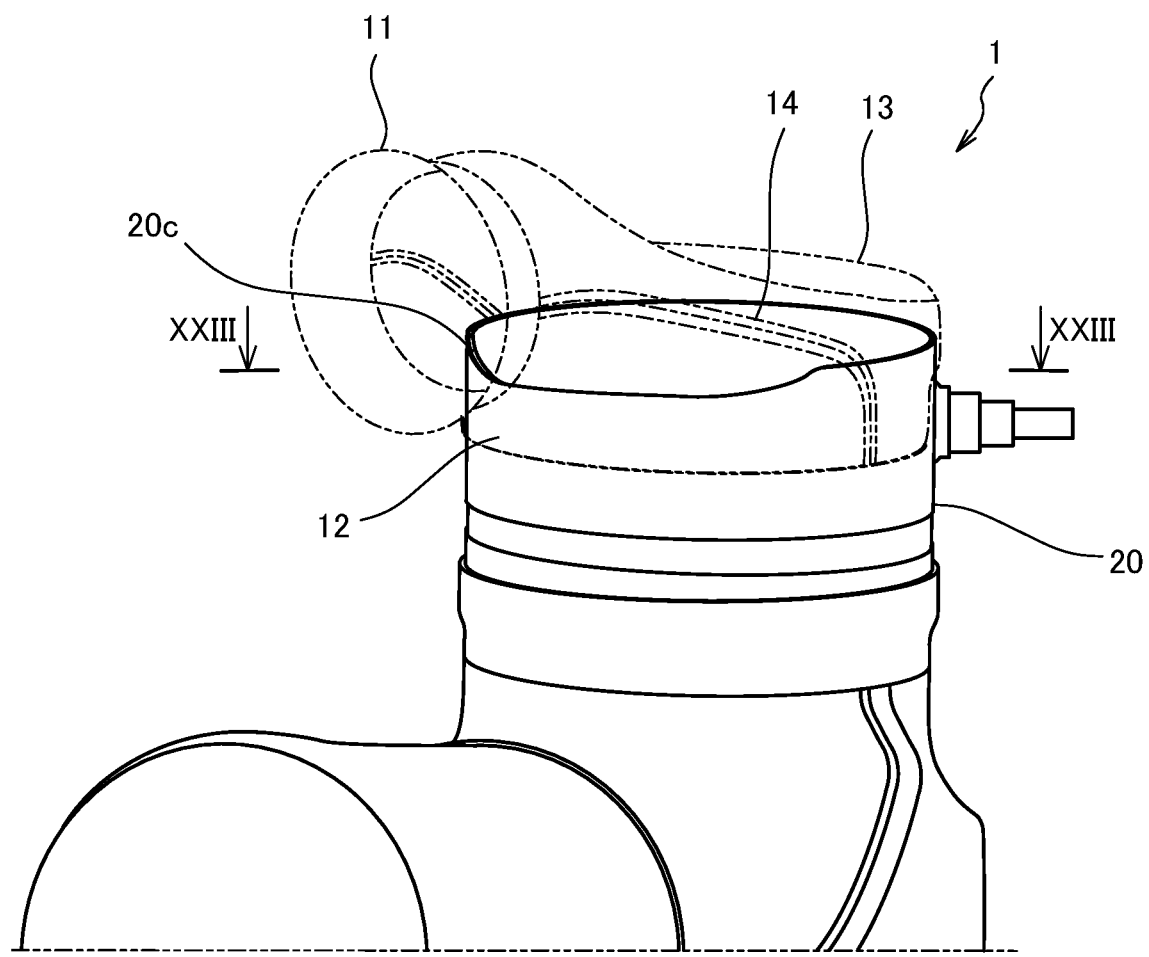
FIG. 22 is a perspective view showing another modification of the embodiment of the present invention.
Figure 23:
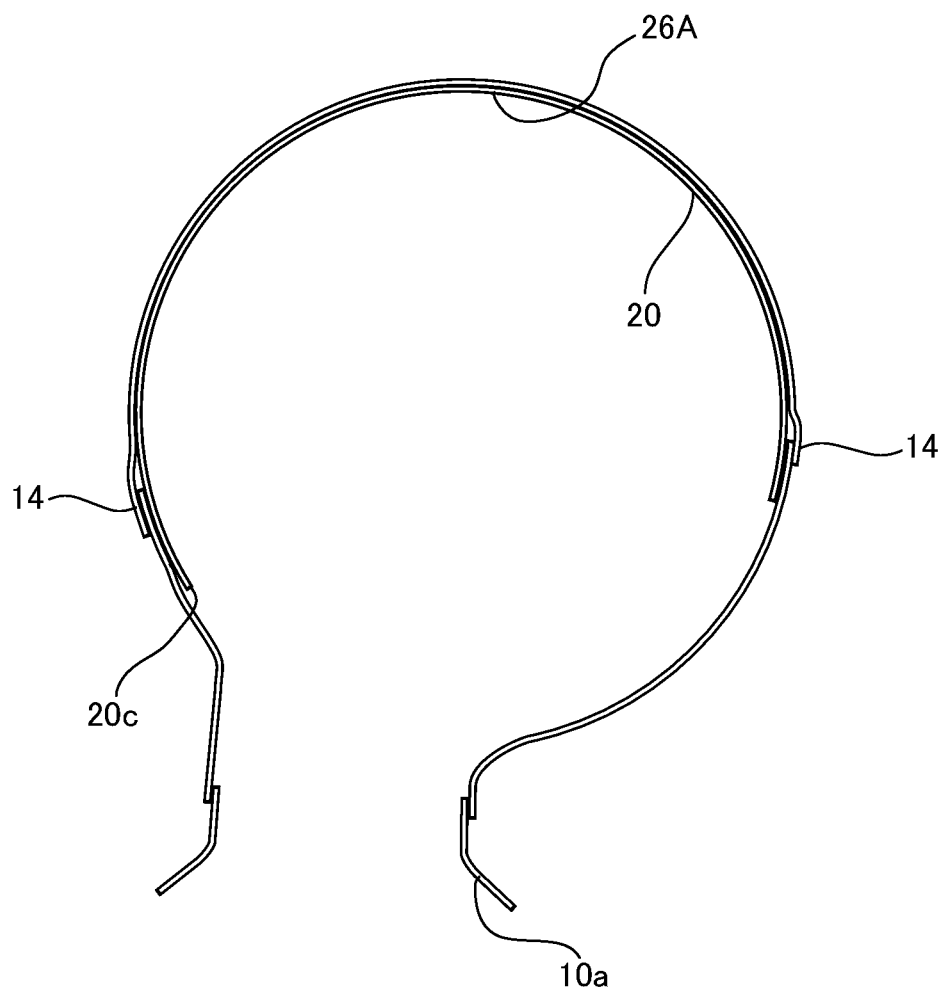
FIG. 23 is a sectional view taken along XXIII-XXIII in FIG. 22.

As shown in FIGS. 1 and 2, in order to reduce the size of the exhaust gas processing device 1, the first case 20 is inserted deeply into the first flow path member 10. Specifically, the first case 20 is inserted to a position at which the inlet-side opening portion 20*a* faces the inlet-side opening portion 10*a* serving as an inlet of the first flow path member 10. In other words, the EHC 21 is penetrated into the first flow path member 10, and so, a distance to the inlet-side opening portion 10*a* is short. Therefore, as shown in FIG. 3, the first case 20 is formed with the inlet-side cut-out portion 20*c* such that the flow of the exhaust gas G entering from the inlet-side opening portion 10*a* is not blocked. In other words, the inlet-side cut-out portion 20*c* allows passage of the exhaust gas G flowing from the inlet-side opening portion 10*a*. With such a configuration, while achieving the size reduction of the exhaust gas processing device 1, the inhibition of the flow of the exhaust gas caused by the size reduction is suppressed. As shown in FIGS. 3, 20, and 21, it is required to form the inlet-side cut-out portion 20*c* at least at a portion where the exhaust gas G flowing in the first direction P passes. As shown in FIGS. 22 and 23, the inlet-side cut-out portion 20*c* may be formed so as to extend to surrounding regions of the above-described portion. However, as described below, at the overlapped portions 14 between the first member 12 and the second member 13 as described below, a gap is likely to be formed between the first member 12 and the second member 13, and if the soldering to the first case 20 is performed at these portions, spatters S tend to splash into the inside through this gap. In other words, if the cut-out portion is to be formed so as to extend to this position, the spatters S are likely to be scattered into the inside. Thus, it is preferable that the inlet-side cut-out portion 20*c* be formed so as to avoid the overlapped portions 14.

In addition, as shown in FIGS. 1 and 2, a cut-out portion 16 is formed in the first flow path member 10 at a position where the electrode 24 is to be provided by cutting out a substantially semi-circular portion so as to avoid the electrode 24. In order to suppress an effect from welding heat to the electrode 24 during the welding of the first flow path member 10 and the first case 20, the cut-out portion 16 is formed so as to be larger than a contour of the electrode 24. Therefore, the electrode 24 can be arranged only at a portion where an overlapped length between the first flow path member 10 and the first case 20 is equal to or longer than a predetermined length. The arrangement of the electrode 24 will be described in detail below with reference to FIGS. 4 to 11.

The exhaust gas G that has been guided from the outlet-side opening portion 10*b* of the first flow path member 10 enters the TWC 25, and the TWC 25 purifies the exhaust gas G flowing in the second direction Q. The TWC 25 is supported by the downstream-side barrel portion 29 via a barrel-shaped inner case 25*a* that covers an outer circumference of the TWC 25.

As shown in FIG. 3, the temperature sensor 71 is inserted into a space between the EHC 21 and the TWC 25. The temperature sensor 71 detects the temperature [° C.] of the exhaust gas G that has been heated in the EHC 21 and that is to be guided to the TWC 25. In other words, the temperature of the exhaust gas G detected by the temperature sensor 71 is substantially equivalent to the temperature of the TWC 25.

As shown in FIGS. 1 and 2, the second case 30 has a first member 31, a second member 32, and overlapped portions 33. As shown in FIG. 3, the second case 30 has an inlet-side opening portion 30*a* through which the exhaust gas G enters and an outlet-side opening portion 30*b* through which the exhaust gas G flows out. The second case 30 is provided with an air-fuel ratio sensor 35 as a sensor.

As shown in FIG. 3, the exhaust gas G that has passed through the TWC 25 and that is flowing in the second direction Q enters through the inlet-side opening portion 30*a*. From the outlet-side opening portion 30*b*, the exhaust gas G is guided towards the downstream side so as to flow in the third direction R intersecting with the second direction Q. The second case 30 changes the travelling direction of the exhaust gas G from the second direction Q to the third direction R. In this embodiment, in the second case 30, the flow of the exhaust gas G flowing in the second direction Q corresponding to the center axial direction of the first case 20 is turned by being deflected by about 100° to the flow flowing along the third direction R corresponding to the center axial direction of the third case 40.

As shown in FIGS. 1 and 2, the first member 31 is provided on the inner side with respect to the flow of the exhaust gas G. The second member 32 is provided on the outer side with respect to the flow of the exhaust gas G. The first member 31 and the second member 32 are overlapped at the overlapped portions 33, and they are welded at the overlapped portions 33 to form a single body.

As shown in FIG. 3, the air-fuel ratio sensor 35 has a measuring portion 34 for performing measurement of the exhaust gas G. The air-fuel ratio sensor 35 performs determination on the exhaust gas G that has passed the TWC 25. The air-fuel ratio sensor 35 has a bar-shaped member, and the measuring portion 34 is provided on a tip end surface of the bar-shaped member. A main body portion of the air-fuel ratio sensor 35 is attached to the second member 32 from the outside of the second case 30 such that the measuring portion 34 is positioned on the flow path between the TWC 25 and a GPF 41.

In this embodiment, the air-fuel ratio sensor 35 attached to the second case 30 is provided such that the measuring portion 34 is positioned at a position that is on the flow path between the TWC 25 and the GPF 41 and that is in a region extending along the shape of an inner wall surface of the second case 30, in which the flow rate of the exhaust gas G is increased, and the flow rate of the exhaust gas G is higher at this position than that in other positions.

The second case 30 is provided between an outer circumferential surface of the TWC 25 and an inner circumferential surface of the second case 30. The second case 30 has: an outer circumference flow path 36 that covers an outer circumference of the TWC 25; a diverting portion 37 that is formed by inwardly projecting second case 30 and that diverts the exhaust gas G that has passed the TWC 25 such that the exhaust gas G is guided towards each of the GPF 41 and the outer circumference flow path 36; and a guide portion 38 that guides a remaining of the exhaust gas G that has been diverted at the diverting portion 37 to the outer circumference flow path 36.

The diverting portion 37 is formed to have a shape in which a part of a tube wall on the outer side with respect to the flowing direction of the exhaust gas G in the second case 30 is projected radially inward.

The guide portion 38 has: a tilted portion 38a that is tilted from the diverting portion 37 by a predetermined angle towards the downstream side in the second direction Q with respect to a flat plane that is perpendicular to the second direction Q; and a curved portion 38b that guides the exhaust gas G that has passed the tilted portion 38a to the outer circumference flow path 36.

The tilted portion 38a is formed to have a substantially flat surface. The tilted portion 38a gradually guides the exhaust gas G that has diverted at the diverting portion 37 to the curved portion 38b and guides the exhaust gas G to the outer circumference flow path 36 by causing the exhaust gas G to flow along the inner wall surface of the second case 30. With such a configuration, it is possible to smoothly guide the exhaust gas G to the outer circumference flow path 36 without disturbing the flow of the exhaust gas G that has passed the TWC 25 and that is directed towards the diverting portion 37.

As shown in FIGS. 1 and 2, the third case 40 is formed to have a barrel shape. As shown in FIG. 3, the third case 40 has an inlet-side opening portion 40a through which the exhaust gas G enters and an outlet-side opening portion 40b through which the exhaust gas G flows out. The third case 40 accommodates the GPF 41.

The GPF 41 purifies the exhaust gas G that has passed the TWC 25, that is the exhaust gas G flowing in the third direction R intersecting with the second direction Q. The GPF 41 is supported by the third case 40 via a barrel-shaped inner case 41a that covers an outer circumference of the GPF 41.

As shown in FIGS. 1 and 2, the second flow path member 50 has an outlet-side flange 51, a first member 52, a second member 53, and an overlapped portion 54. The second flow path member 50 has an inlet-side opening portion 50a through which the exhaust gas G flows in (see FIG. 3) and an outlet-side opening portion 50b through which the exhaust gas G flows out.

The outlet-side flange 51 is connected to an exhaust tube (not shown) that guides the exhaust gas G to the outside. The outlet-side flange 51 is provided so as to project out from the second flow path member 50 in the radial direction of the third case 40. The outlet-side opening portion 50b is provided at a projected end portion of the outlet-side flange 51.

The first member 52 is provided on the inner side with respect to the flow of the exhaust gas G. The second member 53 is provided on the outer side with respect to the flow of the exhaust gas G. The first member 52 and the second member 53 are overlapped at the overlapped portion 54, and they are welded at the overlapped portion 54 to form a single body.

Next, the flow of the exhaust gas G in the exhaust gas processing device 1 will be described with main reference to FIG. 3.

The exhaust gas G that has entered from the inlet-side opening portion 10a of the inlet-side flange 11 passes the first flow path member 10 and is turned to the second direction Q from the first direction P. The exhaust gas G is then guided to and heated by the EHC 21. The exhaust gas G heated by the EHC 21 is then guided to the TWC 25, and the hydrocarbons and carbon monoxide contained in the exhaust gas G are oxidized and degraded to carbon dioxide and water, and at the same time, the nitrogen oxides are reduced.

The exhaust gas G that has passed the TWC 25 is diverted by the diverting portion 37 that is formed on the inner wall surface of the second case 30 into a flow that is directed towards an upstream side end surface of the GPF 41 directly and a flow directed towards the outer circumference flow path 36 via the guide portion 38.

The flow that is directed towards the upstream side end surface of the GPF 41 directly forms a main flow of the exhaust gas G, and it flows into the upstream side end surface of the GPF 41 directly by being redirected by the diverting portion 37 by an angle of about 100° without being diverted to the outer circumference flow path 36.

The exhaust gas G that has entered the outer circumference flow path 36 via the guide portion 38 flows towards the upstream side end surface of the GPF 41 along the outer circumferential surface of the TWC 25. At this time, the exhaust gas G flowing through the outer circumference flow path 36 heats the TWC 25 from the outer circumference. By guiding the exhaust gas G to the outer circumference flow path 36 as described above, the temperature of the TWC 25 can be increased within a short period of time soon after the engine has been started, and therefore, it is possible to achieve activation of the TWC 25. Especially, because a downstream-side portion of the TWC 25, where the temperature of the TWC 12 is less easily increased, can be heated from the outer circumference, it is possible to shorten the time required for the activation of the TWC 25.

By providing such a double tube structure that is formed with the first case 20 and the second case 30, it is possible to effectively prevent escape of the heat to the outside of the second case 30. It also has an effect that it is possible to reduce resistance in the flow path of the exhaust gas G directed from the outer circumference flow path 36 towards the GPF 41 because the exhaust gas G flowing through the outer circumference flow path 36 does not flows into the TWC 25 by covering the TWC 25 with the first case 20. In addition, because the exhaust gas G flowing through the outer circumference flow path 36 does not flow into the TWC 25, the flow of the exhaust gas G flowing in the TWC 25 towards the second direction Q is prevented from being disturbed.

As described above, the exhaust gas G that has passed the outer circumference flow path 36 flows in the third direction R and enters the GPF 41 after joined with the flow directly directed to the upstream side end surface of the GPF 41 by being diverted by the diverting portion 37.

The fine particulate matters are removed from the exhaust gas G that has entered the GPF 41, and the exhaust gas G is then discharged to the exhaust tube through the second flow path member 50.

Subsequently, the electrode arrangeable regions 26E in the EHC 21 will be described with reference to FIGS. 4 to 11.

Figure 4:
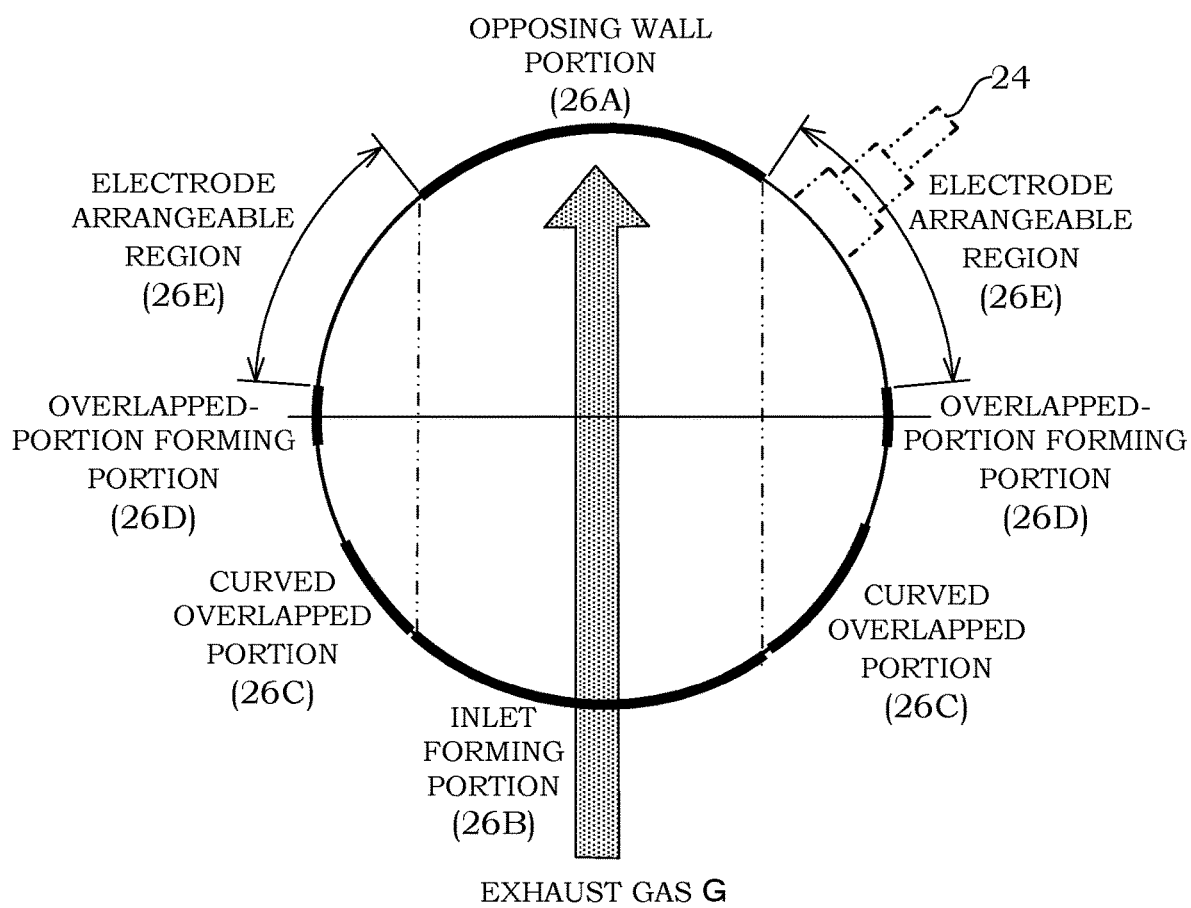
FIG. 4 is a conceptual diagram for explaining electrode arrangeable regions when a heater is viewed from the second direction and is a diagram corresponding to a cross-section taken along IV-IV in FIG. 2.

An overview of the electrode arrangeable regions 26E will be described first with main reference to FIG. 4. FIG. 4 is a conceptual diagram for explaining the electrode arrangeable regions 26E when the EHC 21 is viewed from the second direction Q and is a diagram corresponding to a cross-section taken along IV-IV in FIG. 2.

As shown in FIG. 4, the electrode 24 is arranged in regions between the opposing wall portion 26A, which opposes to the inlet-side opening portion 10a when viewed in the second direction Q in the first case 20, and overlapped-portion forming portions 26D in which the overlapped portions 14 are respectively provided. The opposing wall portion 26A is provided such that the exhaust gas G hits the opposing wall portion 26A if the exhaust gas G that is entering from the inlet-side opening portion 10a travels in the straight line.

With such a configuration, it is possible to prevent the exhaust gas G entering the first flow path member 10 from the engine from hitting the electrode 24 directly. Therefore, it is possible to prevent the electrode 24 for supplying the electric power to the heater 22 from being overheated by the exhaust gas G.

In addition, in the overlapped-portion forming portions 26D where the overlapped portions 14 are respectively provided, the first member 12 and the second member 13 are joined by being overlapped with each other. Although a reason will be described later, it is preferable that the electrode 24 be arranged in regions between the opposing wall portion 26A and the overlapped-portion forming portions 26D.

Furthermore, the electrode 24 is arranged in a region other than an inlet forming portion 26B that coincides with the inlet-side opening portion 10a when viewed in the second direction Q in the first case 20. The inlet forming portion 26B is a region that opposes to the opposing wall portion 26A in the flowing direction of the exhaust gas G (the first direction P).

In addition, the electrode 24 is arranged in a region other than curved overlapped portions 26C that coincide with the curved portion 15 in the first case 20. The curved overlapped portions 26C are regions that respectively extend continuously from both ends of the inlet forming portion 26B when viewed in the second direction Q. Depending on the position of the inlet-side opening portion 10a, for example, in a case in which the inlet-side opening portion 10a is offset from the center axis of the heater 22 to the one side, the curved overlapped portion 26C may be formed only on one end portion of the inlet forming portion 26B.

If the electrode 24 is arranged in the inlet forming portion 26B or in the curved overlapped portions 26C, the exhaust gas G entering the first flow path member 10 does not hit the electrode 24 directly. Thus, it is possible to prevent the electrode 24 for supplying the electric power to the heater 22 from being overheated by the exhaust gas G.

However, the electrode 24 needs to be arranged at the position remote from the first flow path member 10 such that the electrode 24 does not interfere with the inlet forming portion 26B or the curved overlapped portions 26C. In addition, in a case in which the electrode 24 is arranged at the inlet forming portion 26B, the distance between the exhaust gas turbine and the electrode 24 is reduced, and so, there is a risk in that the electrode 24 is overheated due to the temperature of the exhaust gas turbine.

In contrast, in the exhaust gas processing device 1, because the electrode 24 is arranged in the region other than, not only the opposing wall portion 26A, but also the inlet forming portion 26B and the curved overlapped portions 26C, it is possible to arrange the electrode 24 at the position close to the first flow path member 10. Therefore, it is possible to prevent the size increase in the exhaust gas processing device 1. In addition, it is possible to prevent the electrode 24 from being overheated due to the temperature of the exhaust gas turbine.

As described above, if only the overheating due to the exhaust gas G is taken into consideration, the electrode arrangeable regions 26E correspond to the regions other than the opposing wall portion 26A. However, if the overheating due to the exhaust gas turbine and the size reduction in the exhaust gas processing device 1 are taken in to consideration, it is preferable that the electrode arrangeable regions 26E correspond to the regions other than the opposing wall portion 26A, the inlet forming portion 26B, and the curved overlapped portions 26C.

Figure 5:
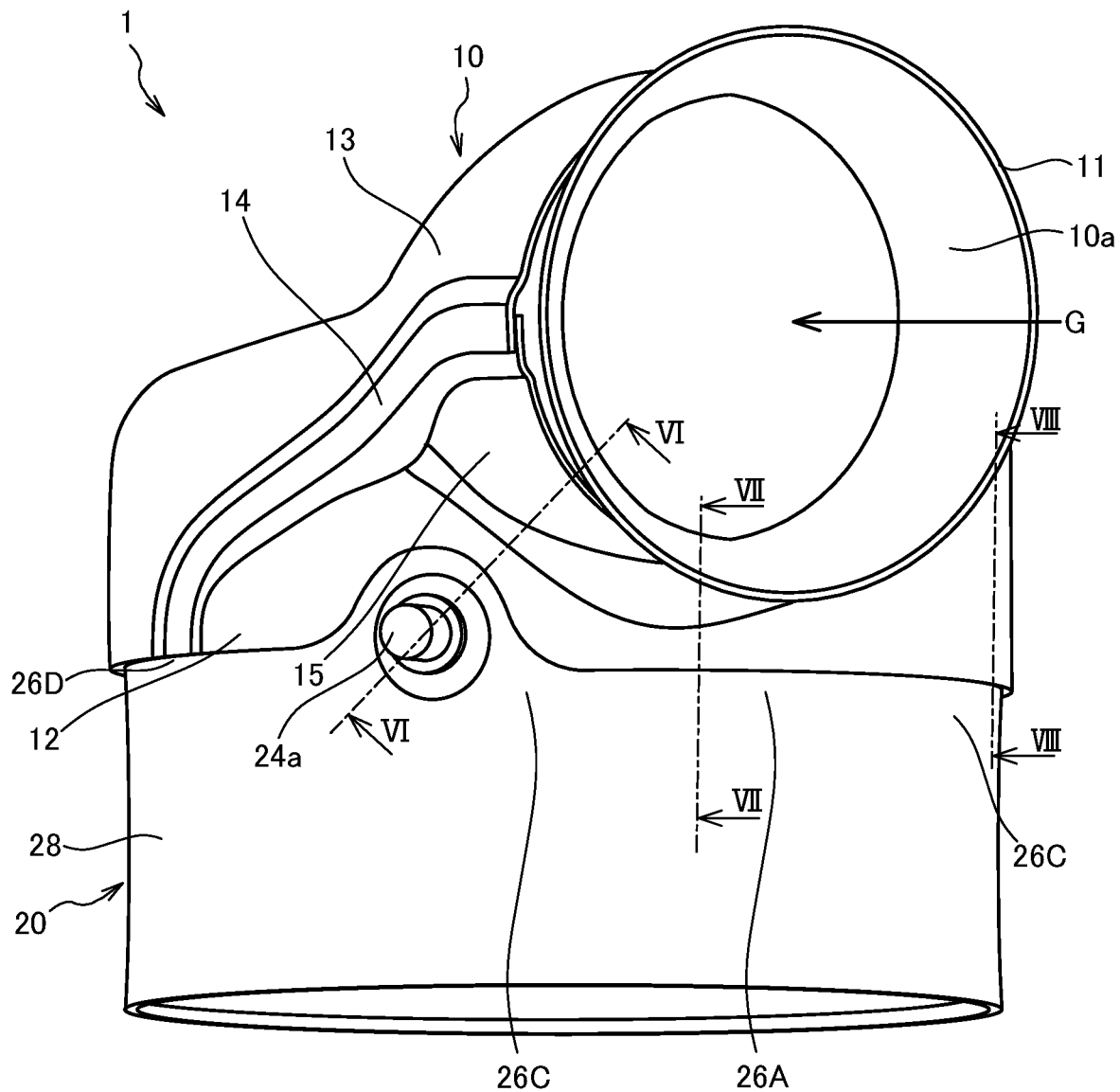
FIG. 5 is a perspective view for explaining a manifold and a case that accommodates the heater.
Figure 6:
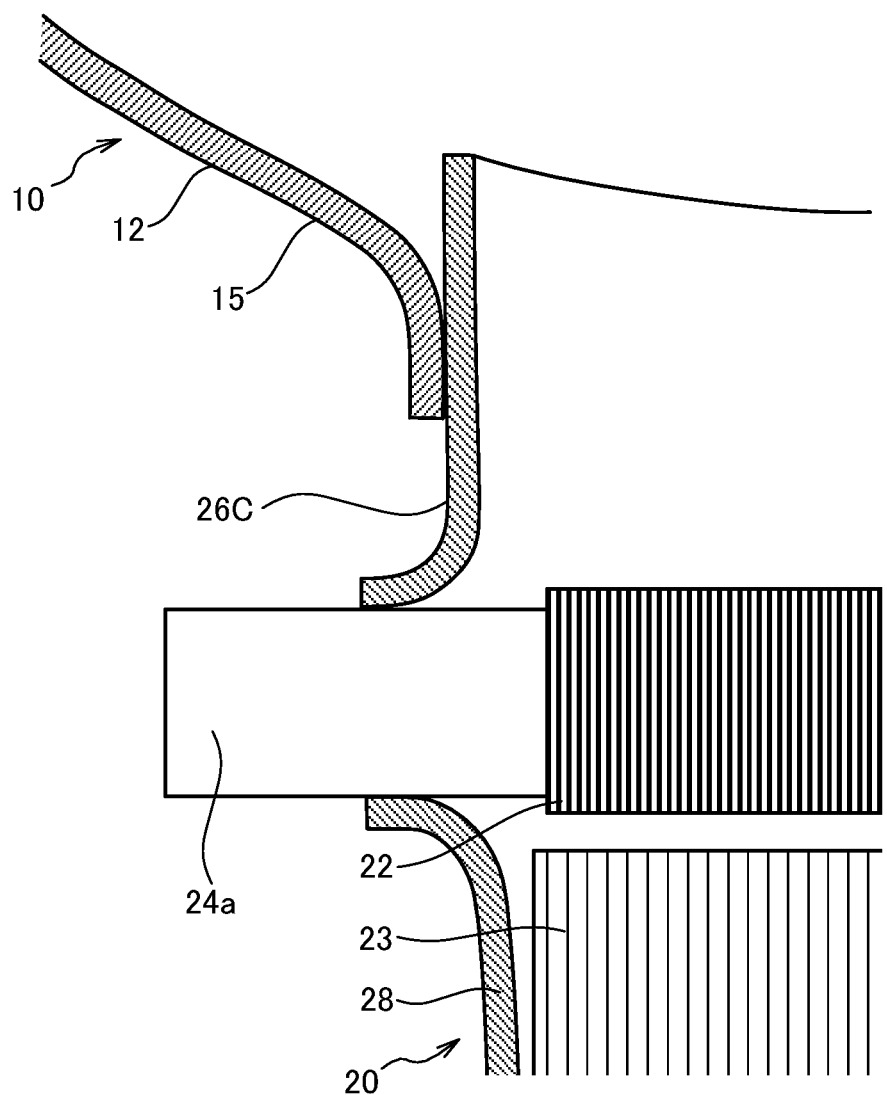
FIG. 6 is a sectional view taken along VI-VI in FIG. 5.
Figure 7:
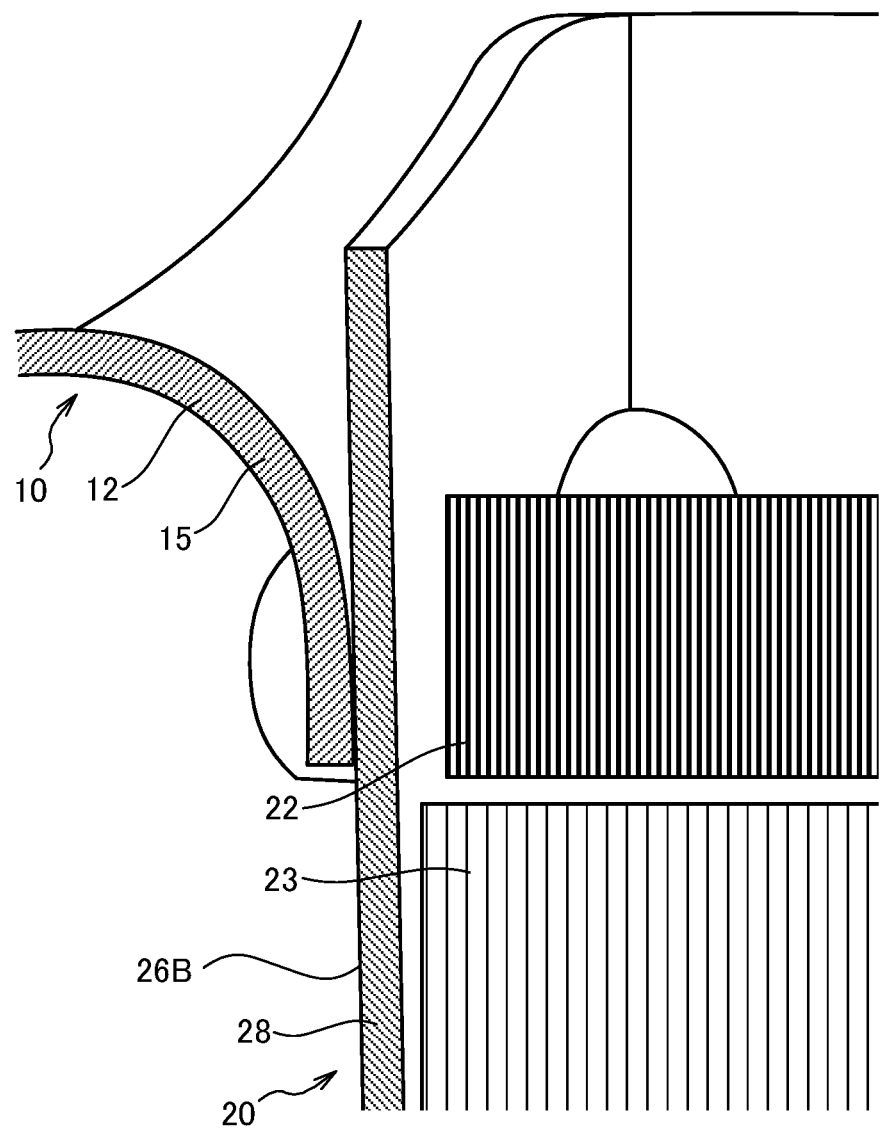
FIG. 7 is a sectional view taken along VII-VII in FIG. 5.
Figure 8:
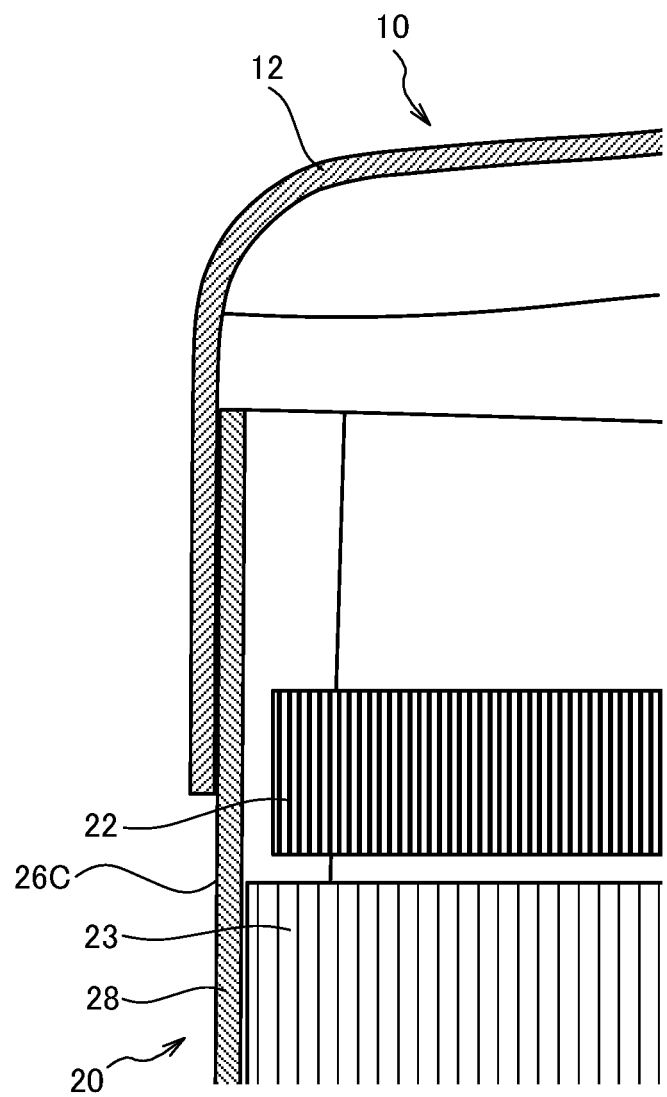
FIG. 8 is a sectional view taken along VIII-VIII in FIG. 5.
Figure 9:
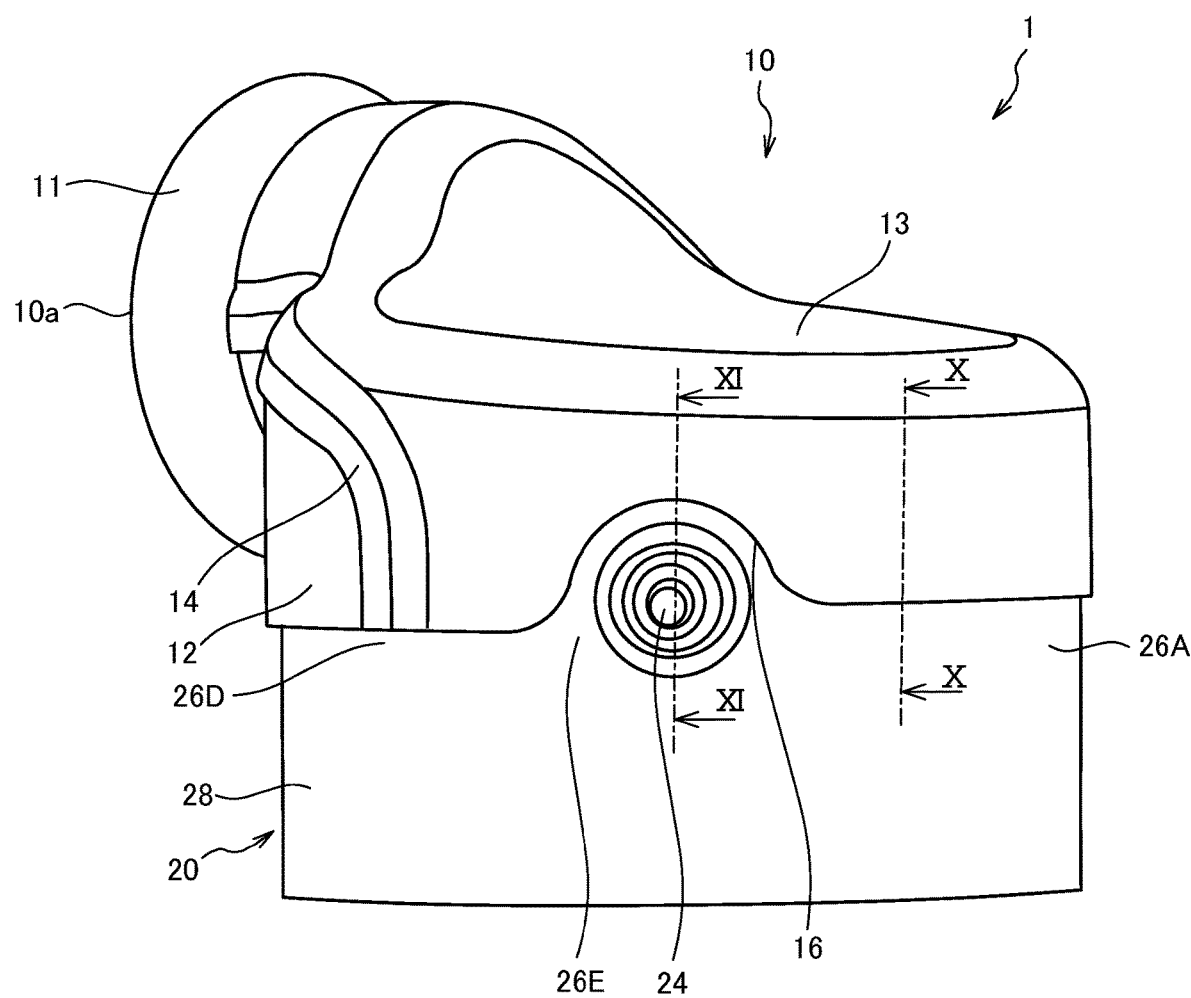
FIG. 9 is a perspective view for explaining the manifold and the case that accommodates the heater, viewed from the different angle from FIG. 5.
Figure 10:
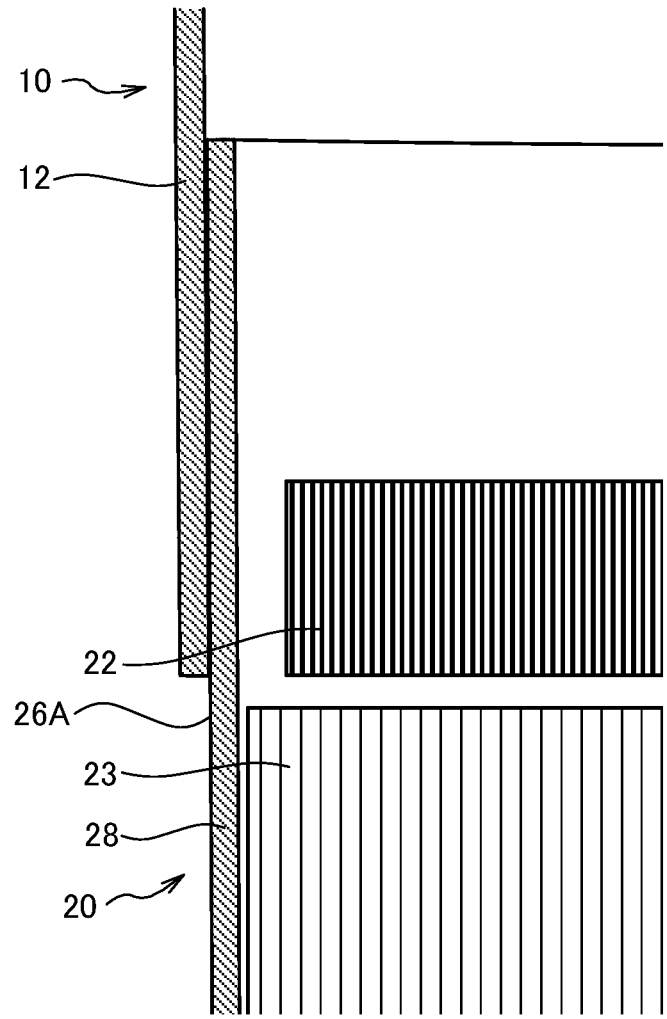
FIG. 10 is a sectional view taken along X-X in FIG. 9.
Figure 11:
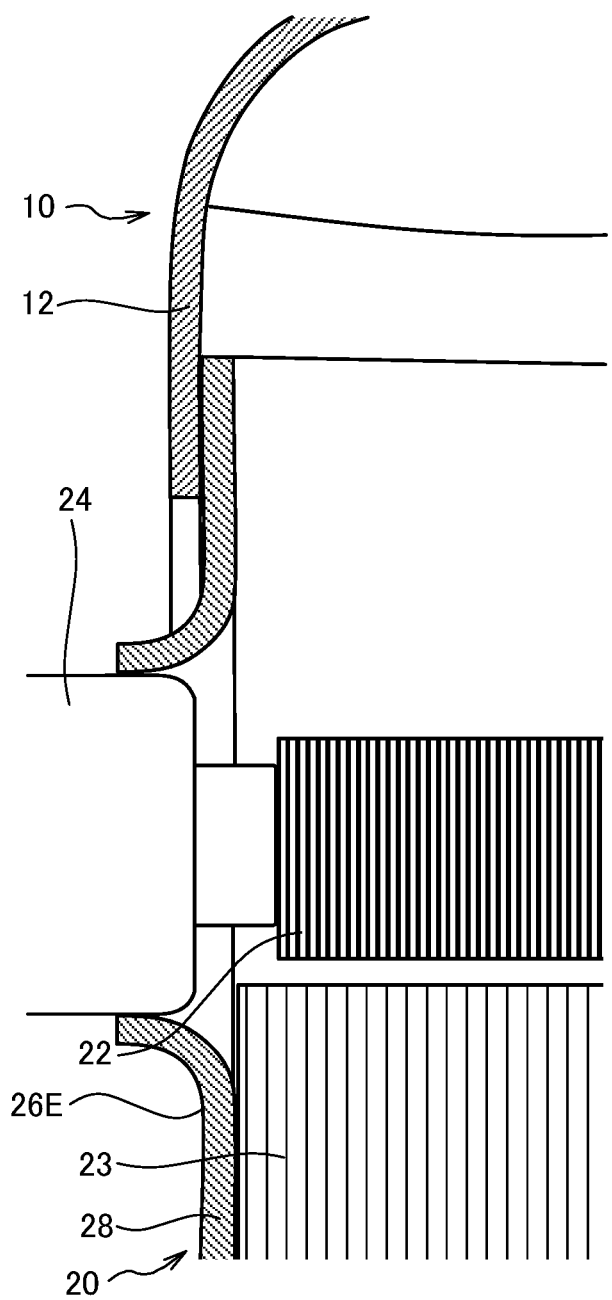
FIG. 11 is a sectional view taken along XI-XI in FIG. 9.

Next, whether or not the electrode 24 can be arranged in each of the positions will be described specifically with reference to FIGS. 5 to 11. FIG. 5 is a perspective view for explaining the first flow path member 10 and the first case 20 that accommodates the EHC 21. FIG. 6 is a sectional view taken along VI-VI in FIG. 5. FIG. 7 is a sectional view taken along VII-VII in FIG. 5. FIG. 8 is a sectional view taken along VIII-VIII in FIG. 5. FIG. 9 is a perspective view for explaining the first flow path member 10 and the first case 20 that accommodates the EHC 21, viewed from the different angle from FIG. 5. FIG. 10 is a sectional view taken along X-X in FIG. 9. FIG. 11 is a sectional view taken along XI-XI in FIG. 9.

As shown in FIG. 5, the cross-section taken along VI-VI is the cross-section at the curved overlapped portion 26C, the cross-section taken along VII-VII is the cross-section at the inlet forming portion 26B, and the cross-section taken along VIII-VIII is the cross-section at the curved overlapped portion 26C on the opposite side from the cross-section taken along VI-VI.

As shown in FIGS. 6 and 8, in the curved overlapped portions 26C, the overlapped length between the first flow path member 10 and the first case 20 is short. Therefore, if the electrode 24 is to be arranged at this position, it is required to be able to ensure an welding allowance by keeping a distance from the first flow path member 10 to the electrode 24. Thus, because there is a risk in that the size of the exhaust gas processing device 1 is increased, it is not preferable to arrange the electrode 24 at this position. The overlapped length means a length of a portion at which the first flow path member 10 and the first case 20 are in close contact such that they are facing (overlapping) with each other.

As shown in FIG. 6, a plug 24a that closes a hole for providing an electrode is provided on the first case 20. Because there is no effect even if the plug 24a is overheated, when the plug 24a is to be provided, there is no need to provide the cut-out portion 16 having a sufficiently large size as in a case in which the electrode 24 is to be provided. Thus, although it is acceptable to provide the plug 24a in the curved overlapped portions 26C, it is not preferred to provide the electrode 24 in the curved overlapped portions 26C.

As shown in FIG. 7, in the inlet forming portion 26B, the overlapped length between the first flow path member 10 and the first case 20 is even shorter than that in the curved overlapped portions 26C. Therefore, if the electrode 24 is to be arranged at this position, it is required to ensure the welding allowance by keeping a long distance between the first flow path member 10 and the electrode 24. Thus, because there is a risk in that the size of the exhaust gas processing device 1 is increased, it is not preferable to arrange the electrode 24 at this position.

As shown in FIG. 9, the cross-section taken along X-X is the cross-section in the opposing wall portion 26A, and the cross-section taken along XI-XI is the cross-section in the electrode arrangeable region 26E.

As shown in FIG. 10, in the opposing wall portion 26A, the overlapped length between the first flow path member 10 and the first case 20 is sufficiently long. However, the exhaust gas G hits against the opposing wall portion 26A when the exhaust gas G that has entered from the inlet-side opening portion 10a travels in the straight line. Therefore, the electrode 24 is directly exposed to the exhaust gas G that has entered the first flow path member 10 from the engine. Thus, because there is a risk in that the electrode 24 is overheated due to the exhaust gas G, it is not preferable to arrange the electrode 24 at this position.

As shown in FIG. 11, in each of the electrode arrangeable regions 26E, the overlapped length between the first flow path member 10 and the first case 20 is sufficiently long. In other words, because the welding allowance between the first flow path member 10 and the first case 20 is large, it is possible to perform the welding by avoiding the electrode 24. In addition, even when the exhaust gas G that has entered from the inlet-side opening portion 10a travels in the straight line, the exhaust gas G does not hit the electrode arrangeable region 26E. In other words, the exhaust gas G that has entered the first flow path member 10 from the engine does not come to contact with the electrode 24 while the exhaust gas G is flowing at the fastest flow rate. Thus, the risk in that the electrode 24 is overheated due to the exhaust gas G is avoided, and at the same time, the risk in that the size of the exhaust gas processing device 1 is increased is also avoided, and therefore, it is preferable to arrange the electrode 24 at this position.

In JP2020-143662A mentioned as a background art, the flowing direction of the exhaust gas entered from the inlet is shifted as the exhaust gas hits the tilted surface before it reaches the farthest part in the flowing direction. In other words, the heat load at a position of the wall on the farthest side (the opposing wall portion 26A in this embodiment) is not high relative to that in this embodiment. In other words, in this embodiment, compared with JP2020-143662A, as a result of correction of a deviation in the flow rate distribution in the heater 22 (or the TWC 25), a more appropriate position is specified for the electrode 24.

Figure 12:
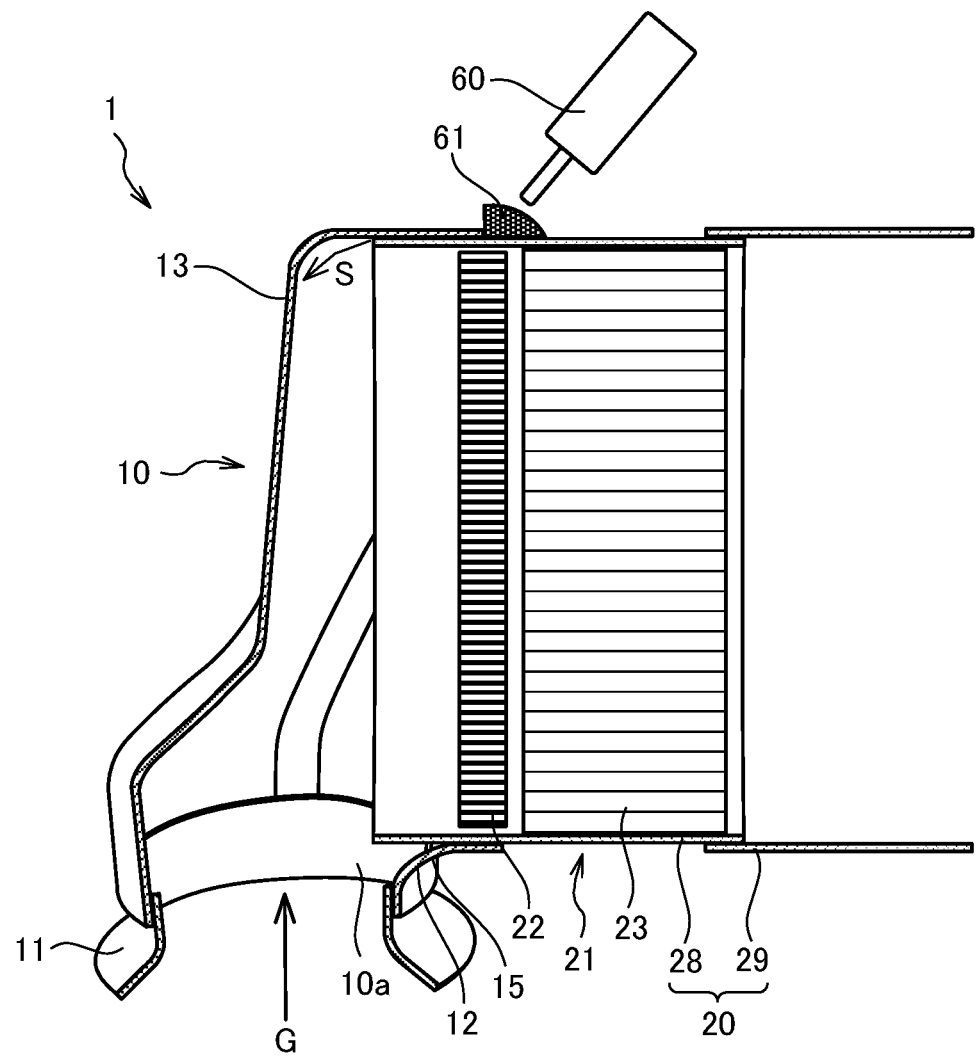
FIG. 12 is a schematic sectional view for explaining welding between the manifold and the case that accommodates the heater.
Figure 13A:
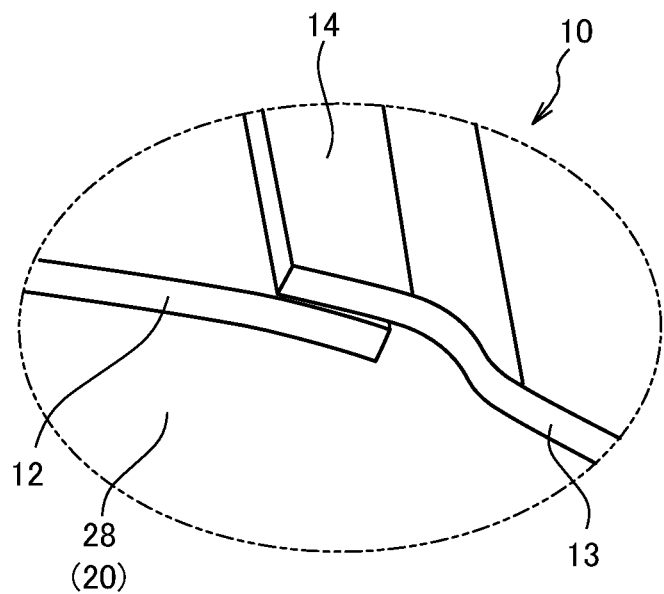
FIG. 13A is a magnified perspective view of a portion XIIIA in FIG. 2.
Figure 13B:
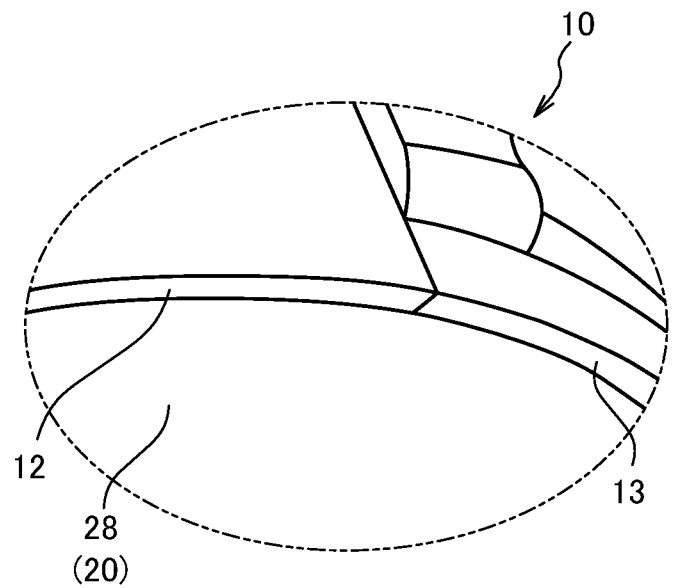
FIG. 13B is a magnified perspective view for explaining a modification of FIG. 13A.
Figure 14:
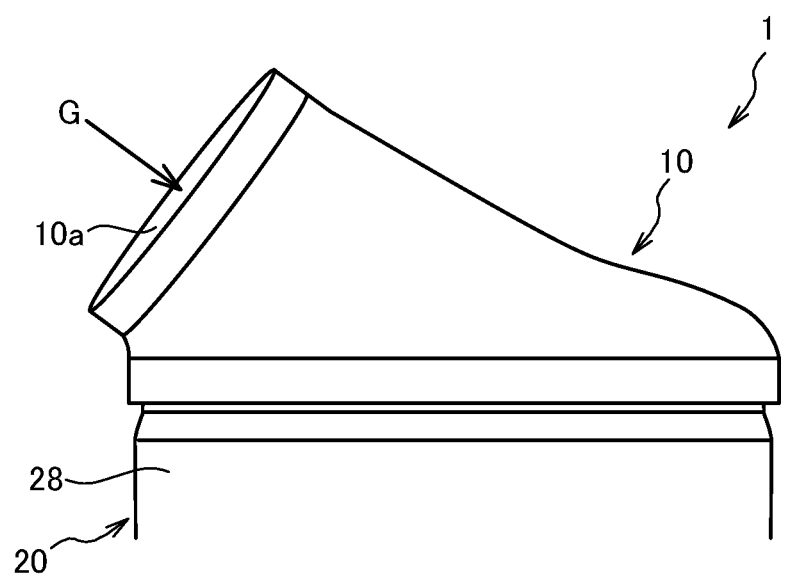
FIG. 14 is a front view for explaining a modification of the manifold.
Figure 15A:
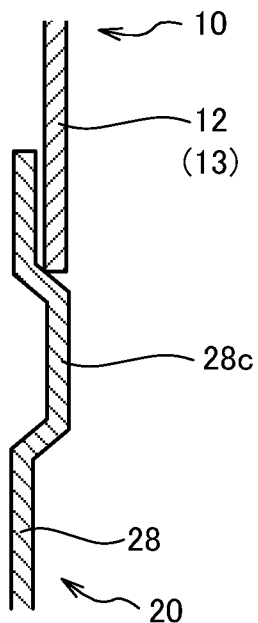
FIG. 15A is a diagram for explaining a modification of a bonded portion between the manifold and the case that accommodates the heater.
Figure 15B:
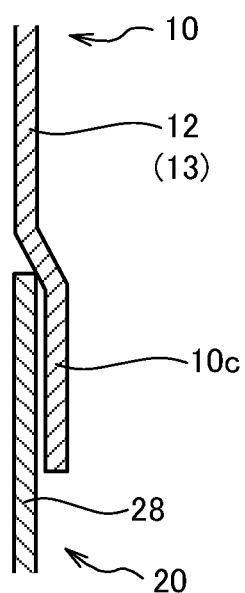
FIG. 15B is a diagram for explaining another modification of the bonded portion between the manifold and the case that accommodates the heater.

Next, the welding of the first flow path member 10 and the first case 20 will be described with reference to FIGS. 12 to 15B. FIG. 12 is a schematic sectional view for explaining the welding between the first flow path member 10 and the first case 20. FIG. 13A is a magnified perspective view of a portion XIIIA in FIG. 2. FIG. 13B is a magnified perspective view for explaining a modification of FIG. 13A. FIG. 14 is a front view for explaining a modification of the first flow path member 10. FIG. 15A is a diagram for explaining a modification of a bonded portion between the first flow path member 10 and the first case 20. FIG. 15B is a diagram for explaining another modification of the bonded portion between the first flow path member 10 and the first case 20.

As shown in FIG. 12, when the welding of the first flow path member 10 and the first case 20 is to be performed, the welding is performed by using a torch 60 to form an welded portion 61 over the entire circumference thereof in a state in which the first case 20 is inserted into an inner circumference of the first flow path member 10.

At this time, the spatters S generated during the welding using the torch 60 may pass through a small gap between the first flow path member 10 and the first case 20 and may splash into the inner circumference of the first flow path member 10. Because the heater 22 is formed of metal, if the spatters S are splashed and adhered onto the heater 22, there is a risk in that a short circuit of the heater 22 is caused.

However, the first case 20 is inserted into the inner circumference of the first flow path member 10. In other words, the first flow path member 10 overlaps with an outer circumference of the first case 20. Therefore, the spatters S are splashed in the direction away from the heater 22 along the inner circumference of the first flow path member 10 and are adhered onto the inner circumference of the first flow path member 10. Thus, by causing the first flow path member 10 to be overlapped with the outer circumference of the first case 20, it is possible to prevent the spatters S from being splashed and adhered onto the heater 22.

In the exhaust gas processing device 1, the first flow path member 10 has a divided structure formed of the first member 12 and the second member 13, and the first member 12 and the second member 13 are welded to each other at the overlapped portions 14. Therefore, compared with a case in which the first flow path member 10 is formed to have a integral structure, a degree of freedom for the shape of the first flow path member 10 is increased.

However, with the overlapped portions 14, a gap is likely to be formed between the first member 12 and the second member 13. As a result, when the first flow path member 10 and the first case 20 are welded at the overlapped portions 14, the spatters S tend to enter the inside of the first case 20 through the gap. This point will be described specifically. While the spatters S are splashed through the gap between the first flow path member 10 and the first case 20, the spatters S travel forward by hitting both of the first flow path member 10 and the first case 20, and thereby, the heat is released from the spatters S. However, if the gap is large as in the overlapped portions 14, the spatters S are ejected into the first case 20 without hitting the first flow path member 10 and/or the first case 20, or by hitting them fewer times. As a result, as described above, there is a risk in that the spatters S are adhered onto the heater 22.

In contrast, by sufficiently ensuring the overlapped length between the first flow path member 10 and the first case 20 especially at the overlapped portions 14, the time required for the spatters S to pass through the gap can be made longer, and thereby, it is possible to cool the spatters S to the extent that the spatters S does not adhere onto the heater 22. In an example shown in FIGS. 22 and 23, the overlapped length at the overlapped portions 14 is made longer than the overlapped length at the position where the inlet-side cut-out portion 20c is arranged.

In addition, in this embodiment, from the following reasons, it is avoided to arrange the electrode 24 at the position below the overlapped portions 14 in the figures. If the electrode is to be provided at this position, it becomes difficult to ensure the overlapped length. If the overlapped length is to be ensured, this will lead to the increase in the size of the device. Furthermore, because of the gap formed by the overlapped portions 14, the spatters S are more likely to be splashed. From the reasons described above, it is avoided to arrange the electrode 24 at the position below the overlapped portions 14 in the figures.

As shown in FIG. 13A, the overlapped portions 14 each has a configuration in which the diameter of an end portion of the second member 13 is increased, and the end portion of the second member 13 is overlapped on an outer circumference of the first member 12. Instead of this configuration, as shown in FIG. 13B, the overlapped portions 14 may not be provided, and an end portion of the first member 12 and the end portion of the second member 13 may be welded by abutting them with each other. In this case, because the small gap is not formed at a tip end of the first member 12, it is possible to further prevent the splashing of the spatters S.

As shown in FIG. 14, the first flow path member 10 may have a hemispherical integral structure. In this case, although a degree of freedom for the shape of the first flow path member 10 is decreased, the first flow path member 10 can be formed by a press-forming, and therefore, it is possible to improve a manufacturability of the first flow path member 10.

As shown in FIG. 15A, the upstream-side barrel portion 28 of the first case 20 may be provided with a large-diameter portion 28c that is formed over the entire circumference thereof. In addition, as shown in FIG. 15B, a downstream end portion of the first flow path member 10 may be provided with a large-diameter portion 10c that is formed over the entire circumference thereof. By providing the large-diameter portion 28c or the large-diameter portion 10c, it is possible to prevent the entry of the spatters S to the inner circumference of the first flow path member 10.

Figure 16:
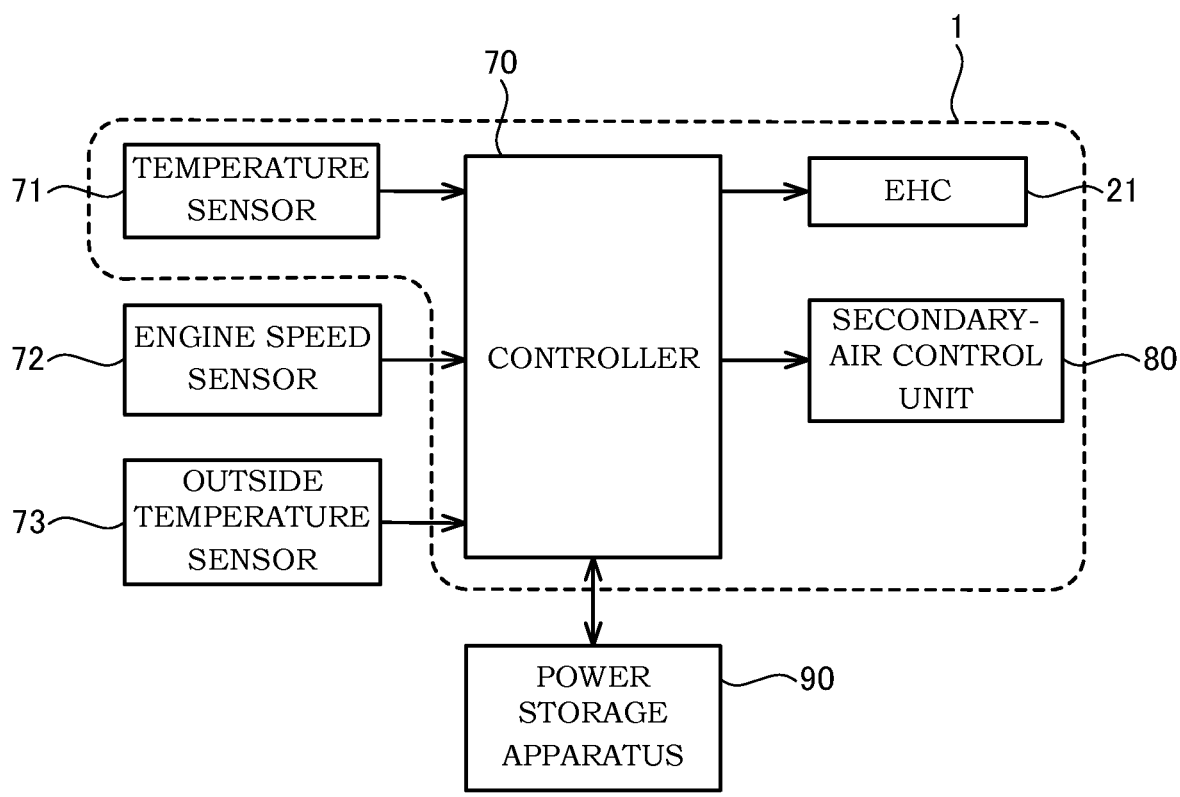
FIG. 16 is a control block diagram of the exhaust gas processing device.
Figure 17:
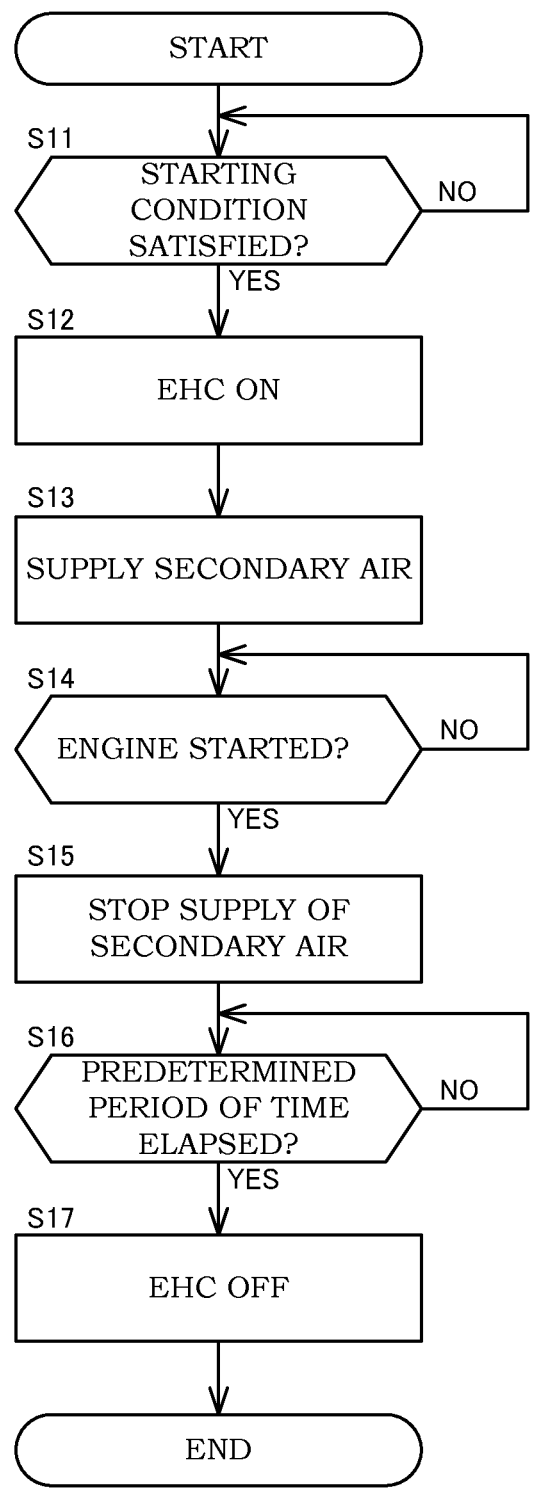
FIG. 17 is a flowchart of a secondary air supply control performed during start of an engine.
Figure 18:
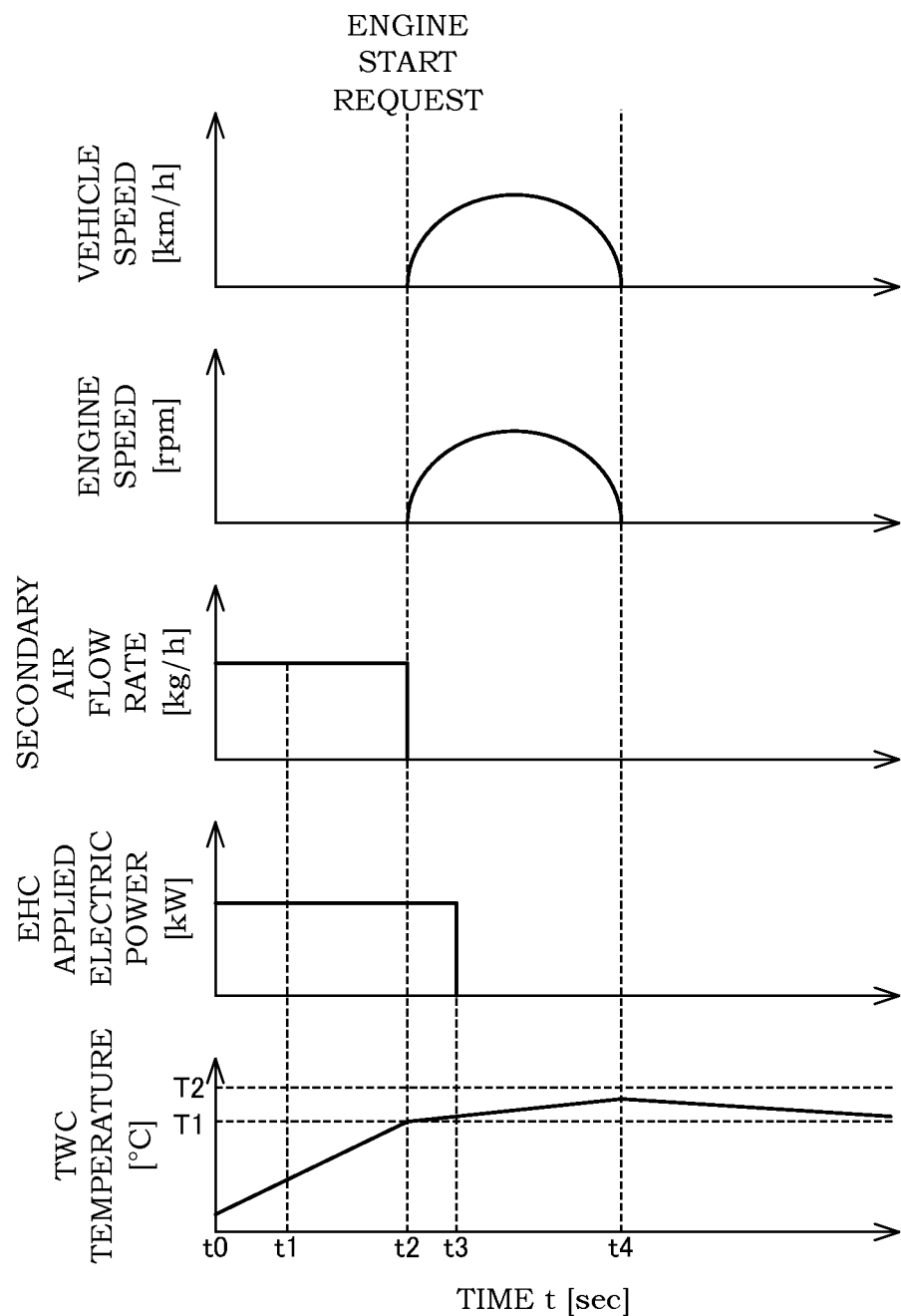
FIG. 18 is a timing chart for explaining the secondary air supply control.

Next, a secondary air supply control will be described with reference to FIGS. 16 to 18. FIG. 16 is a control block diagram of the exhaust gas processing device 1. FIG. 17 is a flowchart of the secondary air supply control during the start of the engine. FIG. 18 is a timing chart for explaining the secondary air supply control.

The configuration of the exhaust gas processing device 1 will be described first with reference to FIG. 16.

As shown in FIG. 16, the exhaust gas processing device 1 has a controller 70. In addition, the engine is provided with an engine speed sensor 72 that detects an engine speed [rpm].

The controller 70 is formed of a microcomputer provided with a central processing unit (a CPU), a read-only memory (a ROM), a random-access memory (a RAM), and an input-output interface (an I/O interface). The controller 70 performs various processings by reading out and executing programs stored in the ROM by the CPU. The controller 70 may also be formed of a plurality of microcomputers. The controller 70 and an ECU (an engine control unit) may be integrated to form a single controller.

The controller 70 controls an operation state of the EHC 21, an operation state of the secondary-air control unit 80, the state of charge of the power storage apparatus 90, and so forth on the basis of signals from the temperature sensor 71, the engine speed sensor 72, an outside temperature sensor 73, and so forth and on the basis of signals from a power storage apparatus 90 corresponding to an SOC (State Of Charge).

Next, the secondary air supply control will be described during the start of the engine with reference to FIG. 17. The flow of the secondary air supply control shown in FIG. 17 is executed by the controller 70.

In Step S11, the controller 70 determines whether or not the starting condition for the secondary air supply control is satisfied. The starting condition is satisfied when, in conjunction with a fact that the engine has not been started, for example, any of the followings are detected:

(1) a state in which a door for a driver's sheet is opened, and a door sensor (not shown) is switched from OFF to ON;
(2) a state in which a driver is seated on the driver's sheet, and the driver is detected by an weight detection sensor (not shown);
(3) a state in which the driver is fastening a seatbelt, and a seatbelt sensor (not shown) is switched from OFF to ON;
(4) a state in which the driver is holding a steering wheel, and a capacitive sensor (not shown) provided on the steering wheel detects that a hand of the driver is touching the steering wheel; and
(5) a state in which radio pulse from an electronic key (not shown) is detected, thereby detecting that a user holding the electronic key is approaching a vehicle.

When it is determined that the starting condition is satisfied in Step S11, the processing proceeds to Step S12. On the other hand, in Step S11, when it is determined that the starting condition is not satisfied, the processing of Step S11 is repeated until the starting condition is satisfied.

In Step S12, the controller 70 turns the EHC 21 ON.

In Step S13, the controller 70 causes the secondary-air control unit 80 to supply (inject) the air. By doing so, because the secondary-air control unit 80 supplies the air while the EHC 21 is turned ON, the air is heated by the EHC 21, and the TWC 25 is heated by the thus-heated air.

In Step S14, it is determined whether or not the engine is started. When it is determined that the engine is started in Step S14, the processing proceeds to Step S15. On the other hand, when it is determined that the engine is not started in Step S14, the processing of Step S14 is repeated until the engine is started.

In Step S15, because the engine is started and the exhaust gas G is supplied to the exhaust gas processing device 1, the controller 70 stops the supply of the air from the secondary-air control unit 80.

In Step S16, it is determined whether or not a predetermined period of time has elapsed. The predetermined period of time is set to the time period required until the temperature of the exhaust gas G is increased to 200 to 300[° C.] after the engine has been started. When it is determined that the predetermined period of time has not elapsed in Step S16, the processing proceeds to Step S17. On the other hand, when it is determined that the predetermined period of time has not elapsed in Step S16, the processing of Step S16 is repeated until the predetermined period of time has elapsed.

In Step S17, because the temperature of the exhaust gas G from the engine is increased to 200 to 300[° C.], the controller 70 turns the EHC 21 OFF.

Next, the secondary air supply control performed by following the flow shown in FIG. 17 will be described specifically with reference to FIG. 18. In FIG. 18, the horizontal axes indicate time t [sec], and the vertical axes respectively indicate temperature [° C.] of the TWC 25, applied electric power [kW] for the EHC 21, a flow rate [kg/h] of the secondary air, engine speed [rpm], and vehicle speed [km/h]. Temperature T1 is the temperature at which the catalyst of the TWC 25 is activated, and it is 200 to 300[° C.], for example. In addition, temperature T2 is an upper limit value of temperature at which the TWC 25 can be used.

At time t0, it is determined that the starting condition for the secondary air supply control is satisfied, and the controller 70 turns the EHC 21 ON and starts the supply of the air by the secondary-air control unit 80.

The supply of the air by the secondary-air control unit 80 may not be started at time t0, and the supply of the air by the secondary-air control unit 80 may be delayed and started at time t1. In other words, the supply of the air by the secondary-air control unit 80 may be started after waiting for the temperature of the EHC 21 to be increased after the EHC 21 is turned ON.

At time t2, the engine is started on the basis of an engine start request. As the engine is started, the exhaust gas G is supplied to the exhaust gas processing device 1, and therefore, the controller 70 stops the supply of the air from the secondary-air control unit 80. At this time, although temperature T of the TWC 25 reached temperature T1, the heating of the exhaust gas G by the EHC 21 is continued.

At time t3, because the predetermined period of time has elapsed since time t2, the controller 70 turns the EHC 21 OFF. In addition, at time t4, the engine is stopped.

Immediately after the engine is started, low-temperature exhaust gas G remaining between cylinders (not shown) of the engine and the exhaust gas processing device 1 is caused to flow into the exhaust gas processing device 1. In addition, because temperature of components forming the engine and a discharge passage themselves is low, the exhaust gas G discharged from the cylinders may also be of low temperature. Therefore, there is a risk in that the temperature of the TWC 25 is lowered by the low-temperature exhaust gas G.

In contrast, in the exhaust gas processing device 1, even when the engine is started, the heating of the exhaust gas G by the EHC 21 is continued until the predetermined period of time has elapsed. Therefore, the low-temperature exhaust gas G is guided to the TWC 25 after being heated by the EHC 21. Thus, it is possible to prevent the temperature of the TWC 25 from being lowered.

Figure 19:
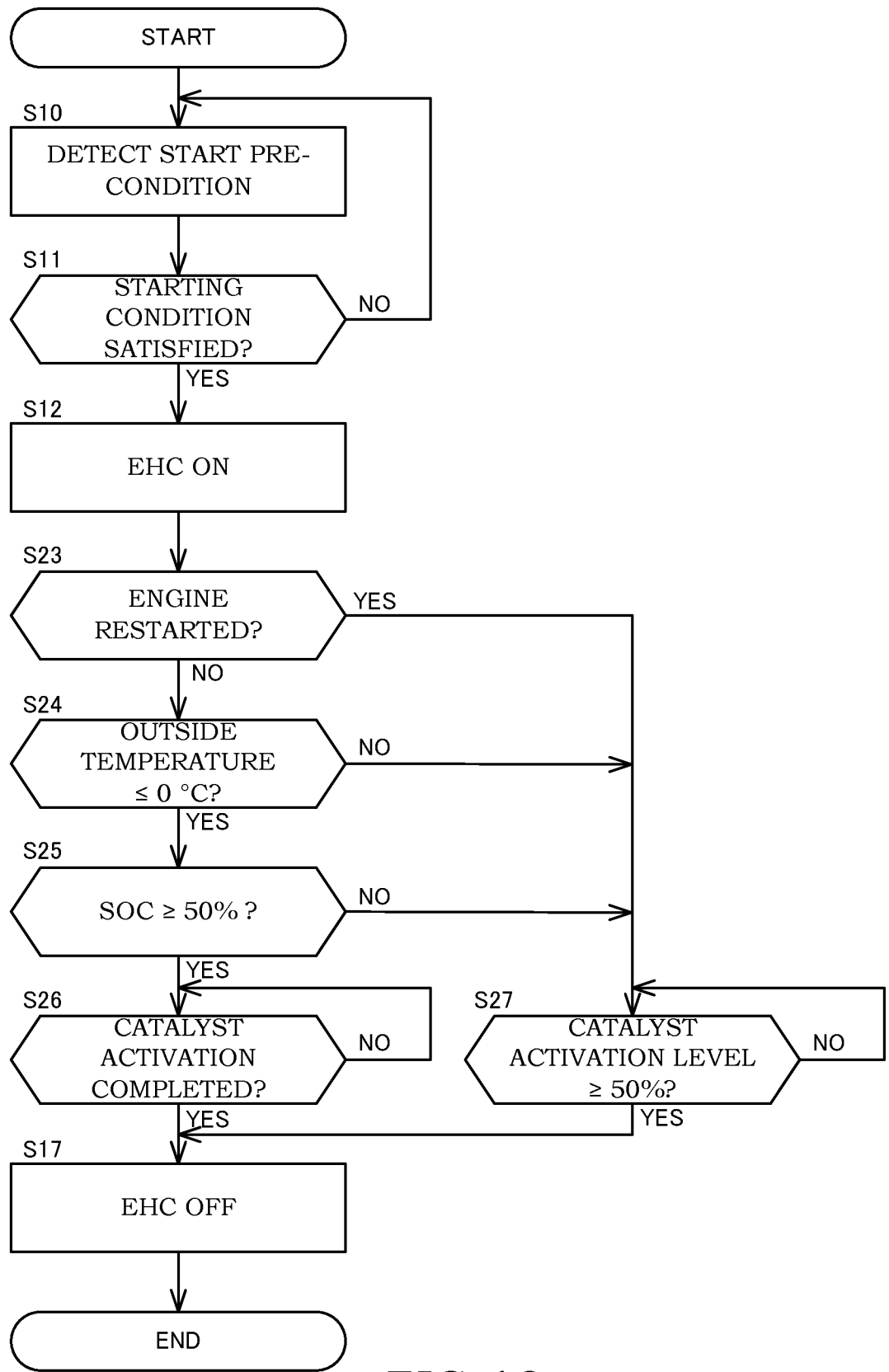
FIG. 19 is a flowchart for control of the heater.

Next, the control of the EHC 21 will be described with reference to FIG. 19. The flow of the control of the EHC 21 shown in FIG. 19 is executed by the controller 70.

In Step S10, the controller 70 detects a start pre-condition of the engine. The start pre-condition of the engine includes, for example, outside temperature detected by the outside temperature sensor 73, the SOC of the power storage apparatus 90 that is estimated on the basis of the signals sent from the power storage apparatus 90, and so forth.

In Step S11, the controller 70 determines whether or not the starting condition of the EHC 21 is satisfied. Because the starting condition is similar to that for Step S11 shown in FIG. 17, the description thereof is omitted.

When it is determined that the starting condition is satisfied in Step S11, the processing proceeds to Step S12. On the other hand, when it is determined that the starting condition is not satisfied in Step S11, the processings of Steps S10 and S11 are repeated until the starting condition is satisfied.

In Step S12, the controller 70 turns the EHC 21 ON.

In Step S23, the controller 70 determines whether or not the engine is restarted. It is determined that the engine is restarted based on the fact that the engine is started in a state in which the engine has not been cooled completely (a state in which water temperature and oil temperature are not lowered completely). When it is determined that the engine is restarted at Step S23, the processing proceeds to Step S27. On the other hand, in Step S23, when it is determined that the engine is not restarted, the processing proceeds to Step S24.

In Step S24, the controller 70 determines whether or not the outside temperature is equal to or higher than 0[° C.]. When it is determined that the outside temperature is equal to or higher than 0[° C.] in Step S24, the processing proceeds to Step S25. On the other hand, when it is determined that the outside temperature is not equal to or higher than 0[° C.] in Step S24, in other words, when it is determined that the outside temperature is lower than 0[° C.], the processing proceeds to Step S27.

In Step S25, the controller 70 determines whether or not the SOC of the power storage apparatus 90 is equal to or higher than 50[%]. When it is determined that the SOC of the power storage apparatus 90 is equal to or higher than 50[%] in Step S25, the processing proceeds to Step S28. On the other hand, when it is determined that the SOC of the power storage apparatus 90 is not equal to or higher than 50[%] in Step S25, in other words, when it is determined that the SOC of the power storage apparatus 90 is lower than 50[%], the processing proceeds to Step S27.

In Step S26, it is determined whether or not the activation of the TWC 25 is completed. When it is determined that the activation of the TWC 25 is completed in Step S26, the processing proceeds to Step S17. On the other hand, when it is determined that the activation of the TWC 25 is not completed in Step S26, the processing of Step S26 is repeated until the activation of the TWC 25 is completed. This state in which the EHC 21 is operated until the activation of the TWC 25 is completed corresponds to a first operating state.

In Step S17, the controller 70 turns the EHC 21 OFF.

On the other hand, it is determined whether or not the activation level of EHCF 21 is equal to or higher than 50[%] in Step S27, to which the processing proceeds when it is determined that the engine is restarted in Step S23, when it is determined that the outside temperature is not equal to or lower than 0[° C.] in Step S24, and when it is determined that the SOC of the power storage apparatus 90 is not equal to or higher than 50[%] in Step S25.

When it is determined that the activation level of the TWC 25 becomes equal to or higher than 50[%] in Step S27, the processing proceeds to Step S17, and the controller 70 turns the EHC 21 OFF. On the other hand, when it is determined that the activation level of the TWC 25 has not reached 50[%] in Step S27, the processing of Step S27 is repeated until the activation level of the TWC 25 reaches 50[%]. This state in which the EHC 21 is operated until the activation level of the TWC 25 reaches 50[%] corresponds to a second operating state.

As described above, the controller 70 switches a plurality of operating states of the EHC 21 on the basis of the outside temperature and the SOC of the power storage apparatus 90. By doing so, it is possible to extend a travel distance achieved by an electric powertrain (not shown), such as an electric motor, etc. for driving the vehicle, and to suppress emission of carbon dioxide.

Specifically, when the outside temperature is equal to or lower than 0[° C.] and when the SOC of the power storage apparatus 90 is lower than 50[%], before the start of the engine, the controller 70 causes the heater to be operated in the first operating state. On the other hand, when the outside temperature is equal to or lower than 0[° C.] and when the SOC of the power storage apparatus 90 is equal to or higher than 50[%], when the outside temperature is higher than 0[° C.], or when the engine is restarted, before the start of the engine, the controller 70 causes the EHC 21 to be operated in the second operating state, which is different from the first operating state. In addition, in the first operating state, the controller 70 executes the operation of the EHC 21 until a state at which the activation level of the TWC 25 is higher than that in the second operating state is achieved.

By doing so, when the outside temperature is low, but the SOC of the power storage apparatus 90 is sufficiently high, it is possible to activate the TWC 25 by operating the EHC 21 by using the electric power stored in the power storage apparatus 90.

On the other hand, when the outside temperature is low, but the SOC of the power storage apparatus 90 is not sufficiently high, because the TWC 25 is activated by operating the EHC 21 until the activation level of the TWC 25 reaches 50[%], it is possible to activate the TWC 25 while ensuring the SOC of the power storage apparatus 90 for the vehicle to travel.

In addition, when the outside temperature is sufficiently high or when the engine is restarted, because it is an environment in which the TWC 25 is activated easily, the TWC 25 is activated by operating the EHC 21 until the activation level of the TWC 25 reaches 50[%]. By doing so, it is possible to activate the TWC 25 without deteriorating the SOC of the power storage apparatus 90 more than required.

The above-described control method of the exhaust gas processing device 1 and the controller 70 are not limited to the configuration for the exhaust gas processing device 1. In other words, it suffices that the exhaust gas processing device 1 is provided with at least the heater 22 and the TWC 25, and the present invention can be applied without depending on a structure of the case, etc.

As described above, the exhaust gas processing device 1 of the vehicle having the engine and the power storage apparatus 90 that supplies the electric power to the electric powertrain is further provided with: the catalyst carrier (the TWC 25) that purifies the exhaust gas G; the heater 22 that is provided on the upstream side of the TWC 25 in the flowing direction of the exhaust gas G and that heats the exhaust gas G to be guided to the TWC 25 by receiving the electric power supply from the power storage apparatus 90; and the controller 70 that controls the operation state of the heater 22, and the exhaust gas processing device 1 is characterized in that, when the outside temperature is equal to or lower than 0° C. and the state of charge (the SOC) of the power storage apparatus 90 is equal to or higher than 50%, before the start of the engine, the controller 70 causes the heater 22 to be operated in the first operating state, and when the outside temperature is equal to or lower than 0° C. and the state of charge (the SOC) of the power storage apparatus 90 is lower than 50%, when the outside temperature is higher than 0° C., or when the engine is restarted, before the start of the engine, the controller 70 causes the heater 22 to be operated in the second operating state that is different from the first operating state.

In addition, in the first operating state, the controller 70 may execute the operation of the heater 22 until a state at which the activation level of the TWC 25 is higher than that in the second operating state is achieved.

Although a detailed description will be omitted, the state of charge (the SOC) of the power storage apparatus 90 is output from a state-of-charge estimation device (not shown) on the basis of a detected value from an electric current sensor (not shown) and is input directly or indirectly to the controller 70. However, these configurations are not limited thereto.

In addition, the outside temperature is also output by a temperature sensor (not shown) to the controller 70 directly or indirectly.

Although JP2020-143662A described above discloses the catalytic converter including the heater on the upstream side of the catalyst for purifying the exhaust gas, the control of the heater is not disclosed.

In contrast, the exhaust gas processing device 1 provided with the above-described controller 70 is capable of extending the travel distance achieved by the electric powertrain, such as the electric motor, etc., for driving the vehicle and suppressing the emission of carbon dioxide.

Although the embodiment of the present invention has been described in the above, the above-mentioned embodiment merely illustrates a part of application examples of the present invention, and the technical scope of the present invention is not intended to be limited to the specific configurations of the above-described embodiment.

The above-described reference example, the respective embodiments, and the respective modifications may be combined appropriately.

The present application claims priorities based on Japanese Patent Application 2021-129328 filed with the Japan Patent Office on Aug. 5, 2021 and Japanese Patent Application 2021-197164 filed with the Japan Patent Office on Dec. 3, 2021, the entire contents of which are incorporated into this specification by reference.

The invention claimed is:

1. An exhaust gas processing device configured to process exhaust gas discharged from an engine, the exhaust gas processing device comprising:
   a manifold having an inlet through which the exhaust gas that has been discharged from the engine and that is flowing in a first direction enters and an outlet configured to guide the exhaust gas to downstream such that the exhaust gas flows in a second direction intersecting with the first direction, the manifold being configured to change a travelling direction of the exhaust gas from the first direction to the second direction;
   a first catalyst carrier into which the exhaust gas that has been guided from the outlet of the manifold flows, the first catalyst carrier being configured to purify the exhaust gas that is flowing in the second direction;
   a heater provided on upstream of the first catalyst carrier in a flowing direction of the exhaust gas, the heater being configured to heat the exhaust gas that has entered from the manifold and that is to be guided to the first catalyst carrier; and
   a case accommodating the first catalyst carrier and the heater, wherein
   an inlet-side opening portion of the case is inserted into an inner circumference of the outlet of the manifold to a position facing the inlet of the manifold, and
   the inlet-side opening portion is formed with an inlet-side cut-out portion, the inlet-side cut-out portion being configured to allow passage of the exhaust gas flowing from the inlet of the manifold.

2. The exhaust gas processing device according to claim 1, wherein
  an end portion of the manifold on an outlet side is welded and fastened to the case,
  the manifold has: a first member provided on an inner side with respect to flow of the exhaust gas; a second member provided on an outer side with respect to the flow of the exhaust gas; and an overlapped portion at which the first member and the second member are overlapped, wherein
  an overlapped length of a portion of the case inserted into the manifold at a position corresponding to the overlapped portion is set to be longer than an overlapped length of a portion of the case inserted into the manifold at a position where the inlet-side cut-out portion is formed.

3. The exhaust gas processing device according to claim 1, further comprising:
  an electrode configured to supply electric power to the heater, the electrode being provided so as to project out from the heater towards outside of the case in a direction intersecting with the second direction, wherein
  the manifold has: a first member provided on an inner side with respect to flow of the exhaust gas; a second member provided on an outer side with respect to the flow of the exhaust gas; and an overlapped portion at which the first member and the second member are overlapped,
  the case has an opposing wall portion facing the inlet, the opposing wall portion being provided such that the exhaust gas entering from the inlet hits the opposing wall portion when the exhaust gas travels in a straight line by passing through the inlet-side cut-out portion along the first direction, and
  the electrode is arranged in a region between the opposing wall portion and an overlapped-portion forming portion, in which the overlapped portion is provided.

4. The exhaust gas processing device according to claim 1, wherein
  the case forms a linear flow path along which the exhaust gas can travel in a straight line by passing through the inlet-side cut-out portion along the first direction, the case having a projecting portion configured to shift a flow of a part of the exhaust gas from the first direction to the second direction on an upstream side of the linear flow path.

5. The exhaust gas processing device according to claim 1, further comprising
  a controller configured to control an operation state of the heater based on an outside temperature and a state of charge of a power storage apparatus, wherein
  the controller is configured to:
    cause the heater to be operated in a first operating state, when the outside temperature is equal to or lower than 0° C. and when the state of charge of the power storage apparatus is equal to or higher than 50%, before start of the engine; and
    cause the heater to be operated in a second operating state that is different from the first operating state, when the outside temperature is equal to or lower than 0° C. and when the state of charge of the power storage apparatus is lower than 50%, when the outside temperature is higher than 0° C., or when the engine is restarted, before the start of the engine.

6. The exhaust gas processing device according to claim 5, wherein
  in the first operating state, the controller executes the operation of the heater until a state at which activation level of the first catalyst carrier is higher than the activation level in the second operating state is achieved.

* * * * *